US012641657B2

(12) United States Patent
Balasubramanian et al.

(10) Patent No.: US 12,641,657 B2
(45) Date of Patent: May 26, 2026

(54) TECHNIQUES FOR SIDELINK BASED DISCOVERY

(71) Applicant: QUALCOMM Incorporated, San Diego, CA (US)

(72) Inventors: Anantharaman Balasubramanian, San Diego, CA (US); Shuanshuan Wu, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/468,465

(22) Filed: Sep. 15, 2023

(65) Prior Publication Data

US 2025/0098004 A1 Mar. 20, 2025

(51) Int. Cl.
*H04W 76/14* (2018.01)
*H04W 8/00* (2009.01)
*H04W 92/18* (2009.01)

(52) U.S. Cl.
CPC ........... *H04W 76/14* (2018.02); *H04W 8/005* (2013.01); *H04W 92/18* (2013.01)

(58) Field of Classification Search
CPC ..... H04W 76/14; H04W 8/005; H04W 92/18; H04W 4/40
See application file for complete search history.

(56) References Cited

U.S. PATENT DOCUMENTS

2014/0003262 A1* 1/2014 He .................... H04W 52/0245
370/252
2014/0112194 A1* 4/2014 Novlan ................ H04W 76/14
370/254

(Continued)

FOREIGN PATENT DOCUMENTS

CA 3186670 A1 2/2022

OTHER PUBLICATIONS

3GPP: "3rd Generation Partnership Project, Technical Specification Group Services and System Aspects, Proximity-Based Services (ProSe), Stage 2 (Release 17)", 3GPP TS 23.303 V17.1.0, Technical Specification, 3rd Generation Partnership Project, Organizational Partners, Sophia Antipolis Valbonne, France, Jun. 2023, pp. 1-130.

(Continued)

*Primary Examiner* — Rina C Pancholi
(74) *Attorney, Agent, or Firm* — Holland & Hart LLP

(57) ABSTRACT

Methods, systems, and devices for wireless communications are described. A discoverer user equipment may transmit, to a first network entity, a discovery message requesting information for discovery of discoveree UEs for sidelink communication. The discovery message may include one or more parameters that indicate a discovery model type, a geographic range relative to the discoverer UE, a cast type, or a combination thereof. The first network entity may transmit the discovery message to one or more second network entities. A second network entity may transmit the discovery message to one or more discoveree UEs. A given discoveree UE may transmit a response to the discovery message indicating whether the discoveree UE is available for discovery by the discoverer UE. The discoverer UE may receive from the first network entity, a response to the discovery message indicating a list the discoveree UEs that satisfy criteria for the discovery.

30 Claims, 15 Drawing Sheets

(56)         References Cited

U.S. PATENT DOCUMENTS

| 2014/0204924 A1* | 7/2014 | Ryu | ................... | H04W 40/246 |
| | | | | 370/338 |
| 2014/0357269 A1* | 12/2014 | Zhou | ................... | H04W 76/14 |
| | | | | 455/434 |
| 2016/0066174 A1* | 3/2016 | Kim | ................... | H04L 43/0864 |
| | | | | 455/41.2 |
| 2017/0374549 A1* | 12/2017 | Anil | ..................... | H04L 63/061 |
| 2019/0075447 A1 | 3/2019 | Lee et al. | | |
| 2021/0168814 A1 | 6/2021 | Chen et al. | | |
| 2022/0039149 A1 | 2/2022 | Chen et al. | | |
| 2023/0014303 A1 | 1/2023 | Di Girolamo et al. | | |
| 2023/0180317 A1* | 6/2023 | Harounabadi | ........ | H04W 72/20 |
| | | | | 370/329 |
| 2023/0217232 A1 | 7/2023 | Cheng et al. | | |

OTHER PUBLICATIONS

International Search Report and Written Opinion—PCT/US2024/044848—ISA/EPO—Dec. 18, 2024.

* cited by examiner

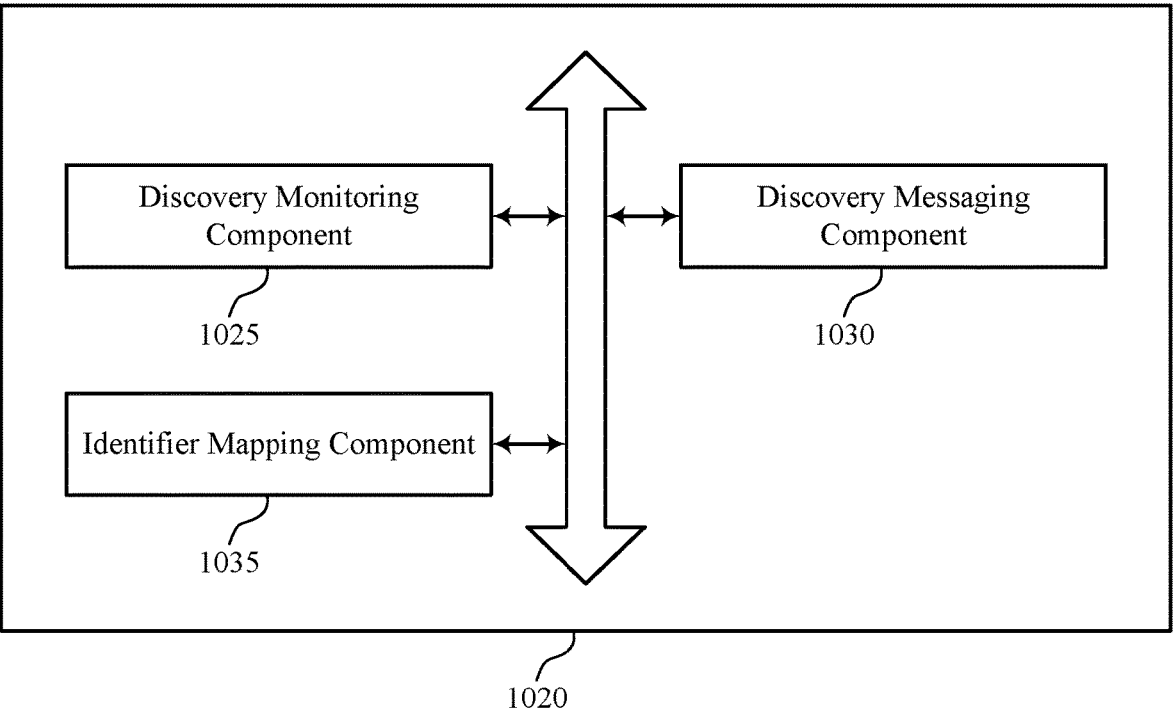
Discovery Monitoring Component
1025
Identifier Mapping Component
1035
Discovery Messaging Component
1030
1020
1000
FIG. 10

130

105

115

Network
Entity

Transceiver

1110

Antenna

1115

Communications
Manager

1120

Memory

Code

1130

1125

1140

Processor

1135

1105

1100

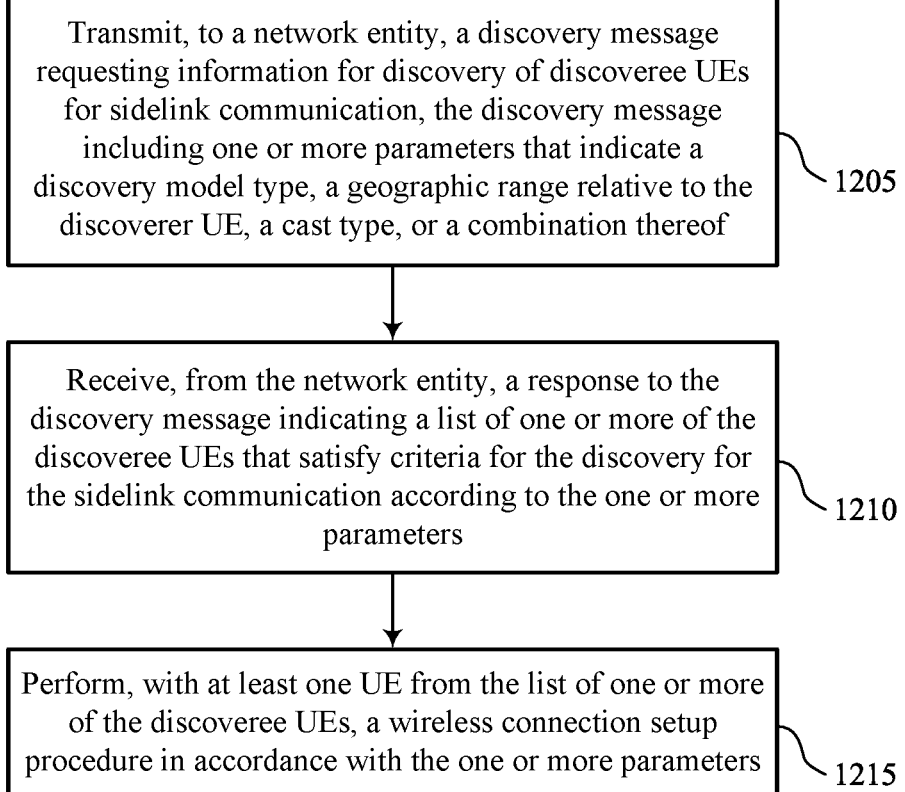

Transmit, to a network entity, a discovery message requesting information for discovery of discoveree UEs for sidelink communication, the discovery message including one or more parameters that indicate a discovery model type, a geographic range relative to the discoverer UE, a cast type, or a combination thereof

1205

Receive, from the network entity, a response to the discovery message indicating a list of one or more of the discoveree UEs that satisfy criteria for the discovery for the sidelink communication according to the one or more parameters

1210

Perform, with at least one UE from the list of one or more of the discoveree UEs, a wireless connection setup procedure in accordance with the one or more parameters

Figure 13:
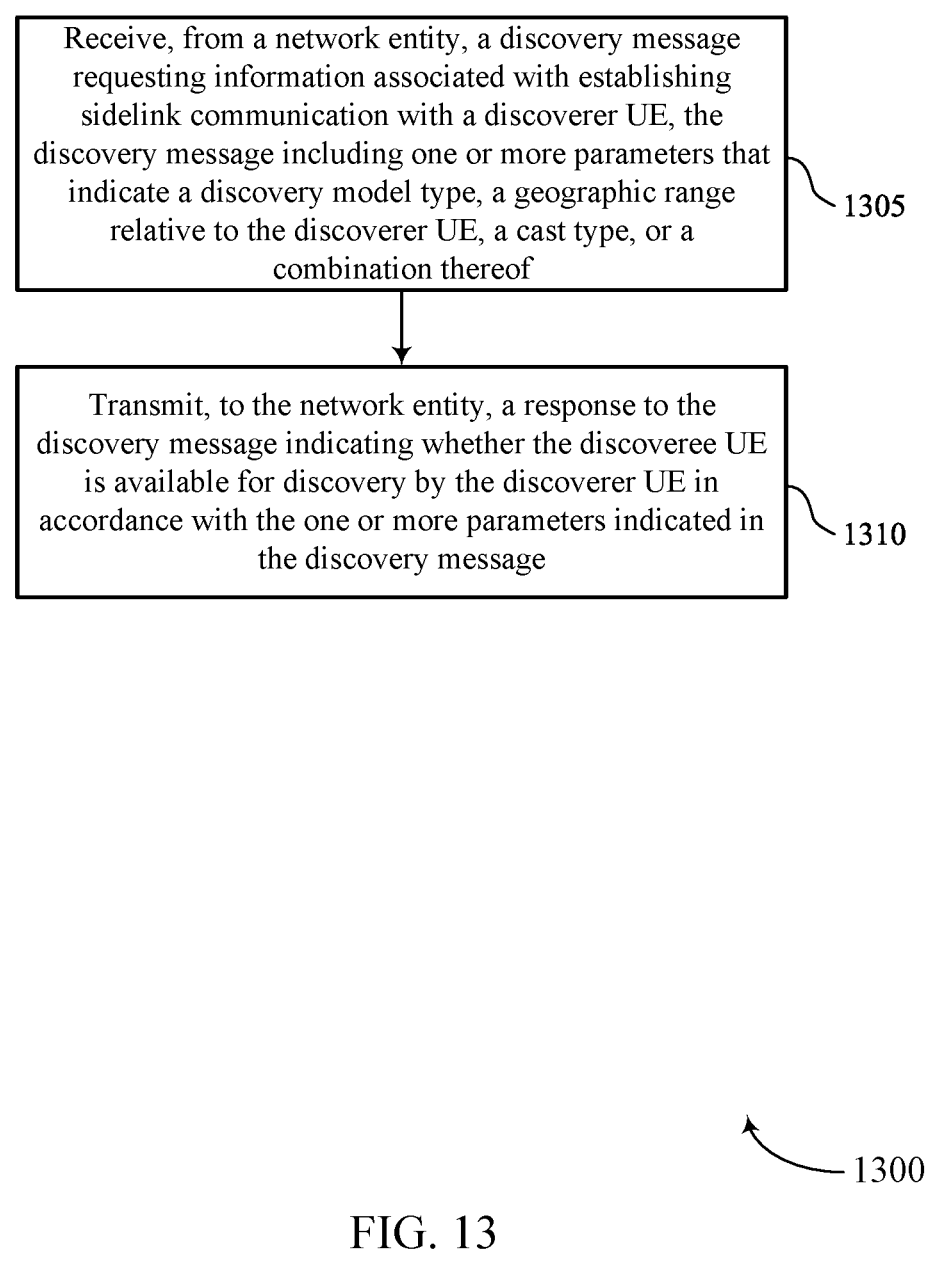

Receive, from a network entity, a discovery message requesting information associated with establishing sidelink communication with a discoverer UE, the discovery message including one or more parameters that indicate a discovery model type, a geographic range relative to the discoverer UE, a cast type, or a combination thereof    1305

Transmit, to the network entity, a response to the discovery message indicating whether the discoveree UE is available for discovery by the discoverer UE in accordance with the one or more parameters indicated in the discovery message    1310

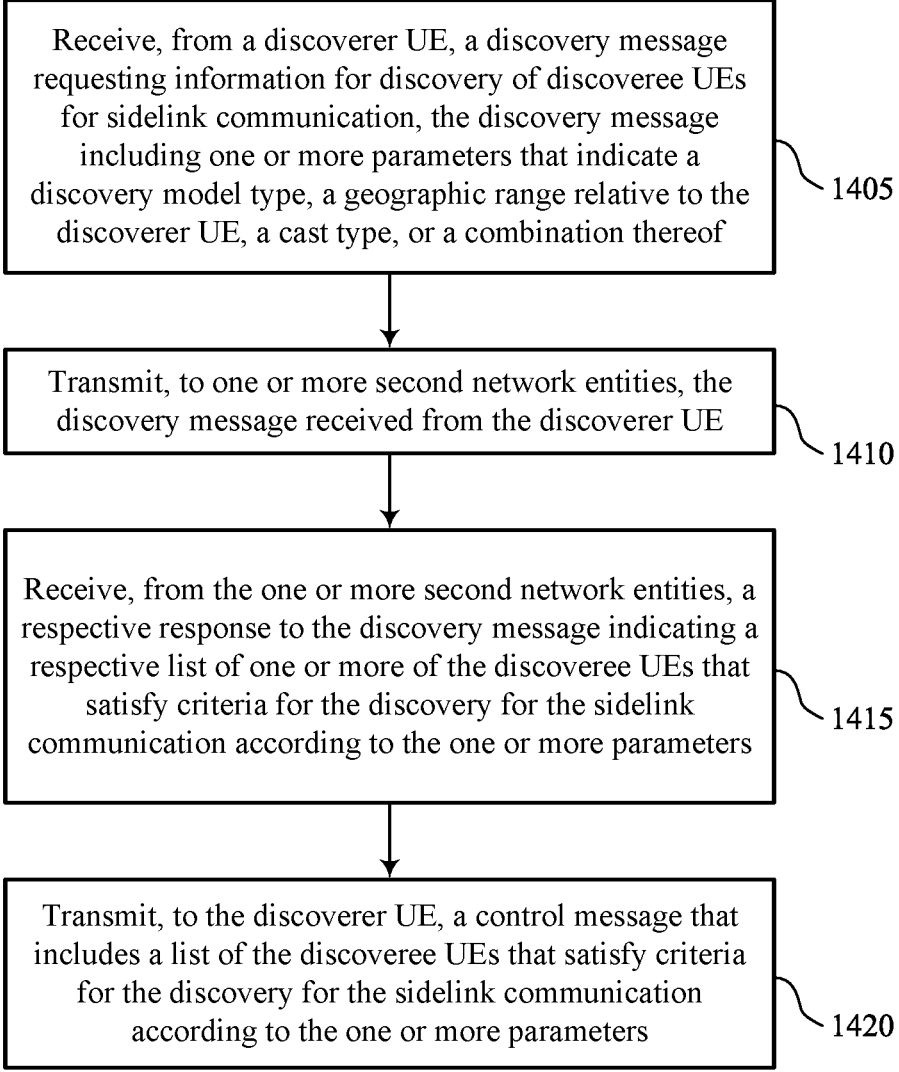

Receive, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof ⟍ 1405

Transmit, to one or more second network entities, the discovery message received from the discoverer UE ⟍ 1410

Receive, from the one or more second network entities, a respective response to the discovery message indicating a respective list of one or more of the discoveree UEs that satisfy criteria for the discovery for the sidelink communication according to the one or more parameters ⟍ 1415

Transmit, to the discoverer UE, a control message that includes a list of the discoveree UEs that satisfy criteria for the discovery for the sidelink communication according to the one or more parameters ⟍ 1420

TECHNIQUES FOR SIDELINK BASED DISCOVERY

FIELD OF TECHNOLOGY

The following relates to wireless communications, including techniques for sidelink based discovery.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for sidelink based discovery. For example, the described techniques provide for a set of user equipments (UEs) to use a vehicle-to-network-to-everything (V2N2X) framework in accordance with sidelink discovery. For example, a UE (e.g., discoverer UE) may transmit, to a network, a discovery message that requests for one or more other UEs (e.g., discoveree UEs) to indicate an availability to be discovered, as part of a V2N2X connection setup. The discovery message may indicate discovery information, such as a discovery model type (e.g., Model-A discovery or Model-B discovery), a geographic location range, a cast type (e.g., unicast, connectionless groupcast, connected groupcast, or broadcast), or a combination thereof. In some examples, the discovery message may include a discovery code that indicates the discovery information. For instance, the UEs may be configured with a set of discovery codes that each correspond to respective discovery information (e.g., respective model type, respective geographic location range, and respective cast type).

The discoverer UE may transmit the discovery message to a first network entity (e.g., a network entity the transmitting UE is connected to), and the first network entity may relay the discovery message to one or more second network entities. As such, a second network entity providing service to the discoveree UEs may indicate the discovery message to the discoveree UEs. For example, the second network entity may include the discovery message in a downlink control information (DCI) (e.g., a DCI that is scrambled with a discovery radio network temporary identifier (RNTI) or a DCI that includes a bit indicating the presence of the discovery message). If a given discoveree UE accepts the request to be discovered, the given discoveree UE may respond to the second network entity indicating an availability to be discovered and its vehicle-to-everything (V2X) ID. The second network entity may generate a list of discoveree UEs willing to be discovered and transmit the list to the first network entity. As such, the first network entity may relay the list back to the discoverer UE, and the discoverer UE may perform a V2N2X connection setup with each receiving UE included on the list.

A method for wireless communications by a discoverer UE is described. The method may include transmitting, to a network entity, a discovery message requesting information for discovery of discoveree UEs for sidelink communication, the discovery message including one or more parameters that indicate a discovery model type, a geographic range relative to the discoverer UE, a cast type, or a combination thereof, receiving, from the network entity, a response to the discovery message indicating a list of one or more of the discoveree UEs that satisfy criteria for the discovery for the sidelink communication according to the one or more parameters, and performing, with at least one UE from the list of one or more of the discoveree UEs, a wireless connection setup procedure in accordance with the one or more parameters.

A discoverer UE for wireless communications is described. The discoverer UE may include one or more memories storing processor executable code, and one or more processors coupled with the one or more memories. The one or more processors may individually or collectively operable to execute the code to cause the discoverer UE to transmit, to a network entity, a discovery message requesting information for discovery of discoveree UEs for sidelink communication, the discovery message including one or more parameters that indicate a discovery model type, a geographic range relative to the discoverer UE, a cast type, or a combination thereof, receive, from the network entity, a response to the discovery message indicating a list of one or more of the discoveree UEs that satisfy criteria for the discovery for the sidelink communication according to the one or more parameters, and perform, with at least one UE from the list of one or more of the discoveree UEs, a wireless connection setup procedure in accordance with the one or more parameters.

Another discoverer UE for wireless communications is described. The discoverer UE may include means for transmitting, to a network entity, a discovery message requesting information for discovery of discoveree UEs for sidelink communication, the discovery message including one or more parameters that indicate a discovery model type, a geographic range relative to the discoverer UE, a cast type, or a combination thereof, means for receiving, from the network entity, a response to the discovery message indicating a list of one or more of the discoveree UEs that satisfy criteria for the discovery for the sidelink communication according to the one or more parameters, and means for performing, with at least one UE from the list of one or more of the discoveree UEs, a wireless connection setup procedure in accordance with the one or more parameters.

A non-transitory computer-readable medium storing code for wireless communications is described. The code may include instructions executable by one or more processors individually or collectively to transmit, to a network entity, a discovery message requesting information for discovery of discoveree UEs for sidelink communication, the discovery message including one or more parameters that indicate a discovery model type, a geographic range relative to the discoverer UE, a cast type, or a combination thereof, receive, from the network entity, a response to the discovery message indicating a list of one or more of the discoveree UEs that satisfy criteria for the discovery for the sidelink communication according to the one or more parameters, and perform, with at least one UE from the list of one or more of the discoveree UEs, a wireless connection setup procedure in accordance with the one or more parameters.

In some examples of the method, discoverer UEs, and non-transitory computer-readable medium described herein, the cast type includes a set of multiple cast types and, the geographic range includes a set of multiple geographic ranges, and each of the set of multiple cast types may be associated with a respective geographic range of the set of multiple geographic ranges.

In some examples of the method, discoverer UEs, and non-transitory computer-readable medium described herein, the discovery message includes a first discovery code that indicates the one or more parameters and the discoverer UE may be associated with a set of discovery codes that each correspond to a respective set of the one or more parameters.

In some examples of the method, discoverer UEs, and non-transitory computer-readable medium described herein, the one or more parameters further indicate a reason for discovery by the discoverer UE.

In some examples of the method, discoverer UEs, and non-transitory computer-readable medium described herein, the discoverer UE may be associated with the network entity and the one or more of the discoveree UEs may be associated with one or more second network entities.

In some examples of the method, discoverer UEs, and non-transitory computer-readable medium described herein, the discovery message may be transmitted via a radio resource control (RRC) configuration message, a RRC reconfiguration message, a medium access control-control element (MAC-CE) message, or a scheduling request (SR) message.

In some examples of the method, discoverer UEs, and non-transitory computer-readable medium described herein, the response to the discovery message further indicates a respective V2X identifier for each discoveree UE of the list of one or more of the discoveree UEs.

In some examples of the method, discoverer UEs, and non-transitory computer-readable medium described herein, the discoverer UE receives the response to the discovery message via a RRC message.

A method for wireless communications by a discoveree UE is described. The method may include receiving, from a network entity, a discovery message requesting information associated with establishing sidelink communication with a discoverer UE, the discovery message including one or more parameters that indicate a discovery model type, a geographic range relative to the discoverer UE, a cast type, or a combination thereof and transmitting, to the network entity, a response to the discovery message indicating whether the discoveree UE is available for discovery by the discoverer UE in accordance with the one or more parameters indicated in the discovery message.

A discoveree UE for wireless communications is described. The discoveree UE may include one or more memories storing processor executable code, and one or more processors coupled with the one or more memories. The one or more processors may individually or collectively operable to execute the code to cause the discoveree UE to receive, from a network entity, a discovery message requesting information associated with establishing sidelink communication with a discoverer UE, the discovery message including one or more parameters that indicate a discovery model type, a geographic range relative to the discoverer UE, a cast type, or a combination thereof and transmit, to the network entity, a response to the discovery message indicating whether the discoveree UE is available for discovery by the discoverer UE in accordance with the one or more parameters indicated in the discovery message.

Another discoveree UE for wireless communications is described. The discoveree UE may include means for receiving, from a network entity, a discovery message requesting information associated with establishing sidelink communication with a discoverer UE, the discovery message including one or more parameters that indicate a discovery model type, a geographic range relative to the discoverer UE, a cast type, or a combination thereof and means for transmitting, to the network entity, a response to the discovery message indicating whether the discoveree UE is available for discovery by the discoverer UE in accordance with the one or more parameters indicated in the discovery message.

A non-transitory computer-readable medium storing code for wireless communications is described. The code may include instructions executable by one or more processors individually or collectively to receive, from a network entity, a discovery message requesting information associated with establishing sidelink communication with a discoverer UE, the discovery message including one or more parameters that indicate a discovery model type, a geographic range relative to the discoverer UE, a cast type, or a combination thereof and transmit, to the network entity, a response to the discovery message indicating whether the discoveree UE is available for discovery by the discoverer UE in accordance with the one or more parameters indicated in the discovery message.

Some examples of the method, discoveree UEs, and non-transitory computer-readable medium described herein may further include operations, features, means, or instructions for receiving DCI scrambled with a RNTI associated with sidelink discovery and decoding the DCI using the RNTI, where a result of the decoding indicates that an associated downlink channel includes the discovery message.

Some examples of the method, discoveree UEs, and non-transitory computer-readable medium described herein may further include operations, features, means, or instructions for receiving, prior to receiving the DCI, an indication of the RNTI associated with sidelink discovery, where decoding the DCI may be based on receiving the indication of the RNTI.

In some examples of the method, discoveree UEs, and non-transitory computer-readable medium described herein, receiving the discovery message may include operations, features, means, or instructions for receiving, via the associated downlink channel, a discovery code that indicates the one or more parameters of the discovery message.

In some examples of the method, discoveree UEs, and non-transitory computer-readable medium described herein, the discoveree UE periodically monitors for the DCI scrambled with the RNTI associated with sidelink discovery.

Some examples of the method, discoveree UEs, and non-transitory computer-readable medium described herein may further include operations, features, means, or instructions for receiving DCI including a bit value that indicates a presence of the discovery message and a discovery code that indicates the one or more parameters of the discovery message.

Some examples of the method, discoveree UEs, and non-transitory computer-readable medium described herein may further include operations, features, means, or instructions for receiving DCI including a bit value that indicates that an associated downlink channel includes the discovery message and receiving the discovery message includes receiving, via the associated downlink channel, a discovery code that indicates the one or more parameters of the discovery message.

In some examples of the method, discoveree UEs, and non-transitory computer-readable medium described herein, receiving the discovery message may include operations, features, means, or instructions for receiving a RRC reconfiguration message that includes, a discovery message indicator that indicates a presence of the discovery message, a discovery code that indicates the one or more parameters of the discovery message, and a reason for discovery by the discoverer UE.

In some examples of the method, discoveree UEs, and non-transitory computer-readable medium described herein, transmitting the response to the discovery message may include operations, features, means, or instructions for transmitting, as part of the response to the discovery message, an availability to be discovered by the discoverer UE according to the one or more parameters indicated in the discovery message and a first V2X identifier associated with the discoveree UE.

Some examples of the method, discoveree UEs, and non-transitory computer-readable medium described herein may further include operations, features, means, or instructions for transmitting, to the network entity, a mapping between a pseudo V2X identifier and the first V2X identifier, where the mapping indicates for the network entity to relay the pseudo V2X identifier to the discoverer UE as part of the response to the discovery message.

In some examples of the method, discoveree UEs, and non-transitory computer-readable medium described herein, the discoverer UE may be associated with a second network entity different than the network entity associated with the discoveree UE.

A method for wireless communications by a network entity is described. The method may include receiving, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof, transmitting, to one or more second network entities, the discovery message received from the discoverer UE, receiving, from the one or more second network entities, a respective response to the discovery message indicating a respective list of one or more of the discoveree UEs that satisfy criteria for the discovery for the sidelink communication according to the one or more parameters, and transmitting, to the discoverer UE, a control message that includes a list of the discoveree UEs that satisfy criteria for the discovery for the sidelink communication according to the one or more parameters.

A network entity for wireless communications is described. The network entity may include one or more memories storing processor executable code, and one or more processors coupled with the one or more memories. The one or more processors may individually or collectively operable to execute the code to cause the network entity to receive, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof, transmit, to one or more second network entities, the discovery message received from the discoverer UE, receive, from the one or more second network entities, a respective response to the discovery message indicating a respective list of one or more of the discoveree UEs that satisfy criteria for the discovery for the sidelink communication according to the one or more parameters, and transmit, to the discoverer UE, a control message that includes a list of the discoveree UEs that satisfy criteria for the discovery for the sidelink communication according to the one or more parameters.

Another network entity for wireless communications is described. The network entity may include means for receiving, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof, means for transmitting, to one or more second network entities, the discovery message received from the discoverer UE, means for receiving, from the one or more second network entities, a respective response to the discovery message indicating a respective list of one or more of the discoveree UEs that satisfy criteria for the discovery for the sidelink communication according to the one or more parameters, and means for transmitting, to the discoverer UE, a control message that includes a list of the discoveree UEs that satisfy criteria for the discovery for the sidelink communication according to the one or more parameters.

A non-transitory computer-readable medium storing code for wireless communications is described. The code may include instructions executable by one or more processors individually or collectively to receive, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof, transmit, to one or more second network entities, the discovery message received from the discoverer UE, receive, from the one or more second network entities, a respective response to the discovery message indicating a respective list of one or more of the discoveree UEs that satisfy criteria for the discovery for the sidelink communication according to the one or more parameters, and transmit, to the discoverer UE, a control message that includes a list of the discoveree UEs that satisfy criteria for the discovery for the sidelink communication according to the one or more parameters.

In some examples of the method, network entities, and non-transitory computer-readable medium described herein, the one or more second network entities satisfy the geographic range relative to the discoverer UE.

In some examples of the method, network entities, and non-transitory computer-readable medium described herein, the one or more second network entities satisfy a quantity second network entities closest to the discoverer UE.

In some examples of the method, network entities, and non-transitory computer-readable medium described herein, the control message may be a RRC message for a vehicle-to-network-to-everything discovery outcome and the list indicates a respective V2X identifier for each of the discoveree UEs.

A method for wireless communications by a network entity is described. The method may include receiving, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof, transmitting a second discovery message to one or more discoveree UEs served by the network entity, the second discovery message including the one or more parameters, receiving, from the one or more discoveree UEs, respective responses to the second discovery message indicating whether the respective discoveree UEs are available for discovery by the discoverer UE in accordance with the one or more parameters indicated in the second discovery message, and transmitting, to the second network entity, a list of discoveree UEs of the one or more discoveree UEs that satisfy criteria for the discovery for the sidelink communication according to the one or more parameters.

A network entity for wireless communications is described. The network entity may include one or more memories storing processor executable code, and one or more processors coupled with the one or more memories. The one or more processors may individually or collectively operable to execute the code to cause the network entity to receive, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof, transmit a second discovery message to one or more discoveree UEs served by the network entity, the second discovery message including the one or more parameters, receive, from the one or more discoveree UEs, respective responses to the second discovery message indicating whether the respective discoveree UEs are available for discovery by the discoverer UE in accordance with the one or more parameters indicated in the second discovery message, and transmit, to the second network entity, a list of discoveree UEs of the one or more discoveree UEs that satisfy criteria for the discovery for the sidelink communication according to the one or more parameters.

Another network entity for wireless communications is described. The network entity may include means for receiving, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof, means for transmitting a second discovery message to one or more discoveree UEs served by the network entity, the second discovery message including the one or more parameters, means for receiving, from the one or more discoveree UEs, respective responses to the second discovery message indicating whether the respective discoveree UEs are available for discovery by the discoverer UE in accordance with the one or more parameters indicated in the second discovery message, and means for transmitting, to the second network entity, a list of discoveree UEs of the one or more discoveree UEs that satisfy criteria for the discovery for the sidelink communication according to the one or more parameters.

A non-transitory computer-readable medium storing code for wireless communications is described. The code may include instructions executable by one or more processors individually or collectively to receive, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof, transmit a second discovery message to one or more discoveree UEs served by the network entity, the second discovery message including the one or more parameters, receive, from the one or more discoveree UEs, respective responses to the second discovery message indicating whether the respective discoveree UEs are available for discovery by the discoverer UE in accordance with the one or more parameters indicated in the second discovery message, and transmit, to the second network entity, a list of discoveree UEs of the one or more discoveree UEs that satisfy criteria for the discovery for the sidelink communication according to the one or more parameters.

In some examples of the method, network entities, and non-transitory computer-readable medium described herein, each respective response to the second discovery message includes a respective V2X identifier associated with a respective discoveree UE and the list of discoveree UEs that satisfy the criteria for the discovery includes each respective V2X identifier.

Some examples of the method, network entities, and non-transitory computer-readable medium described herein may further include operations, features, means, or instructions for receiving, from a first discoveree UE of the one or more discoveree UEs, a mapping between a pseudo V2X identifier and a V2X identifier, where the mapping indicates for the network entity to include the pseudo V2X identifier in the list of discoveree UEs that satisfy the criteria for the discovery.

In some examples of the method, network entities, and non-transitory computer-readable medium described herein, the network entity transmits the list of discoveree UEs that satisfy the criteria for the discovery via an X2 interface.

BRIEF DESCRIPTION OF THE DRAWINGS

FIG. 10 shows a block diagram of a communications manager that supports techniques for sidelink based discovery in accordance with one or more aspects of the present disclosure.

FIGS. 12 through 15 show flowcharts illustrating methods that support techniques for sidelink based discovery in accordance with one or more aspects of the present disclosure.

DETAILED DESCRIPTION

Figure 1:
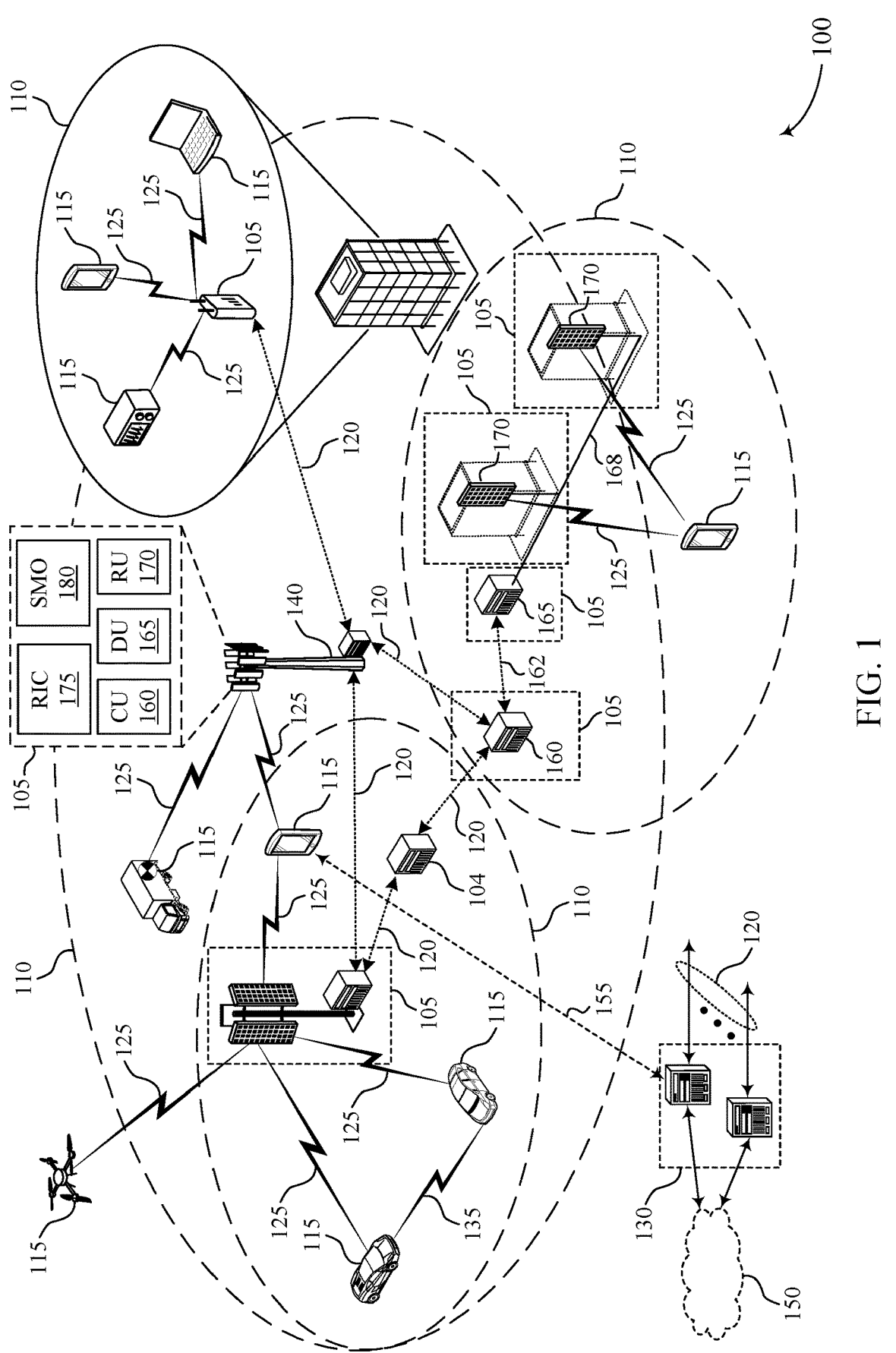
FIG. 1 shows an example of a wireless communications system that supports techniques for sidelink based discovery in accordance with one or more aspects of the present disclosure.

Some wireless systems may support sidelink communications between a first user equipment (UE) and a second UE. The first and second UE may use a discovery mechanism to establish a wireless connection to perform sidelink communications. In some cases, the first UE and second UE may use proximity services (ProSe) based discovery (e.g., evolved packet core (EPC) level discovery). For example, each UE may perform UE registration for ProSe with a ProSe Function corresponding to each UE's respective public land mobile network (PLMN). As such, the first UE may use a first ProSe Function to receive location updates for the second UE, and the second UE may use a second ProSe Function to receive location updates for the first UE. However, ProSe based discovery may incur latency when the first UE and second UE are connected to different PLMNs, which may be less amenable for dynamic mobility scenarios (such as a vehicle UE intending to discover other vehicle UEs when making a turn). Additionally, ProSe based discovery may not support groupcast or broadcast based discovery.

According to the techniques described herein, a set of UEs may use a vehicle-to-network-to-everything (V2N2X) framework in accordance with sidelink discovery. For example, a UE (e.g., discoverer UE) may transmit, to a network, a discovery message that requests for one or more other UEs (e.g., discoveree UEs) to indicate an availability to be discovered, as part of a V2N2X connection setup. The discovery message may indicate discovery information, such as a discovery model type (e.g., Model-A discovery or Model-B discovery), a geographic location range, a cast type (e.g., unicast, connectionless groupcast, connected groupcast, or broadcast), or a combination thereof. In some examples, the discovery message may include a discovery code that indicates the discovery information. For instance, the UEs may be configured with a set of discovery codes that each correspond to respective discovery information (e.g., respective model type, respective geographic location range, and respective cast type).

The discoverer UE may transmit the discovery message to a first network entity (e.g., a network entity the transmitting UE is connected to), and the first network entity may relay the discovery message to one or more second network entities. As such, a second network entity providing service to the discoveree UEs may indicate the discovery message to the discoveree UEs. For example, the second network entity may include the discovery message in a downlink control information (DCI) (e.g., a DCI that is scrambled with a discovery radio network temporary identifier (RNTI) or a DCI that includes a bit indicating the presence of the discovery message). If a given discoveree UE accepts the request to be discovered, the given discoveree UE may respond to the second network entity indicating an availability to be discovered and its vehicle-to-everything (V2X) ID. The second network entity may generate a list of discoveree UEs willing to be discovered and transmit the list to the first network entity. As such, the first network entity may relay the list back to the discoverer UE, and the discoverer UE may perform a V2N2X connection setup with each receiving UE included on the list.

Aspects of the disclosure are initially described in the context of wireless communications systems and a process flow. Aspects of the disclosure are further illustrated by and described with reference to apparatus diagrams, system diagrams, and flowcharts that relate to techniques for sidelink based discovery.

FIG. 1 shows an example of a wireless communications system 100 that supports techniques for sidelink based discovery in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for sidelink based discovery as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an EPC or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of wireless communications system 100, a set of UEs 115 may use a V2N2X framework in accordance with sidelink discovery. For example, a UE 115 (e.g., discoverer UE) may transmit, to a network, a discovery message that requests for one or more other UEs 115 (e.g., discoveree UEs) to indicate an availability to be discovered, as part of a V2N2X connection setup. The discovery message may indicate discovery information, such as a discovery model type (e.g., Model-A discovery or Model-B discovery), a geographic location range, a cast type (e.g., unicast, connectionless groupcast, connected groupcast, or broadcast), or a combination thereof. In some examples, the discovery message may include a discovery code that indicates the discovery information. For instance, the UEs 115 may be configured with a set of discovery codes that each correspond to respective discovery information (e.g., respective model type, respective geographic location range, and respective cast type).

The discoverer UE 115 may transmit the discovery message to a first network entity 105 (e.g., a network entity 105 the transmitting UE 115 is connected to), and the first network entity 105 may relay the discovery message to one or more second network entities 105. As such, a second network entity 105 providing service to the discoveree UEs 115 may indicate the discovery message to the discoveree UEs 115. For example, the second network entity 105 may include the discovery message in DCI (e.g., a DCI that is scrambled with a discovery RNTI or a DCI that includes a bit indicating the presence of the discovery message). If a given discoveree UE 115 accepts the request to be discovered, the given discoveree UE 115 may respond to the second network entity 105 indicating an availability to be discovered and its V2X ID. The second network entity 105 may generate a list of discoveree UEs 115 willing to be discovered and transmit the list to the first network entity 105. As such, the first network entity 105 may relay the list back to the discoverer UE 115, and the discoverer UE 115 may perform a V2N2X connection setup with each receiving UE 115 included on the list.

Figure 2:
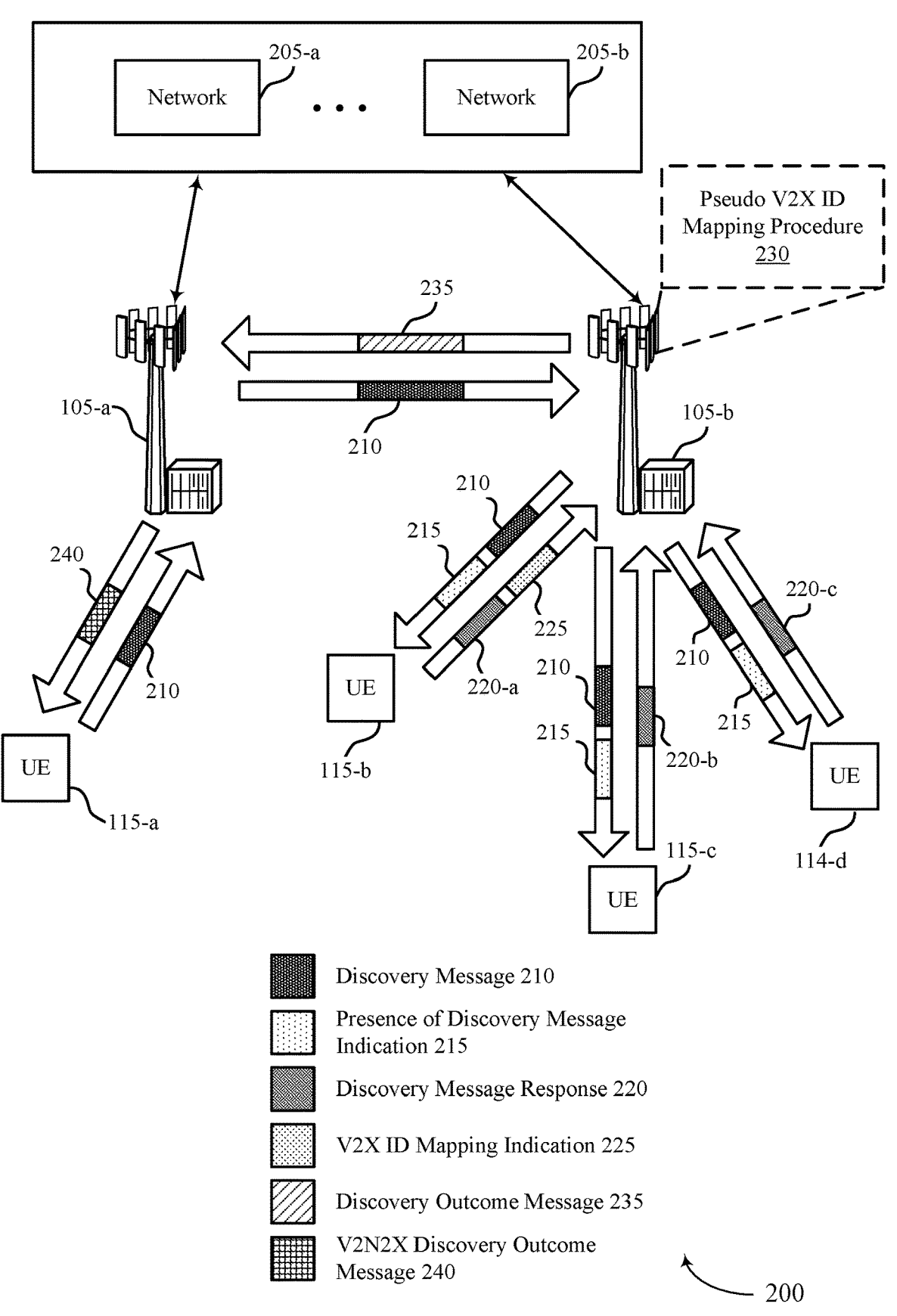
FIG. 2 shows an example of a wireless communications system that supports techniques for sidelink based discovery in accordance with one or more aspects of the present disclosure.

FIG. 2 shows an example of a wireless communications system 200 that supports techniques for sidelink based discovery in accordance with one or more aspects of the present disclosure. In some examples, wireless communications system 200 may implement or be implemented by one or more aspects of wireless communications system 100. For example, wireless communications system 200 may include a UE 115-a, UE 115-b, UE 115-c, and UE 115-d, which may be a respective examples of UEs 115, as described with reference to FIG. 1. Additionally, network entity 105-a and network entity 105-b may be respective network entities 105, as described with reference to FIG. 1.

In some examples, the UEs 115 of wireless communications system 200 may operate in accordance with sidelink discovery operations. Sidelink discovery may refer to a process by which two or more devices communicate with each other directly using various technologies, such as Bluetooth, Wi-Fi Direct, or D2D communication in cellular networks. In some examples, the UEs 115 may perform sidelink discovery via one or more discovery models. For instance, Model-A discovery includes two roles for ProSe-enabled UEs 115, where a first UE 115 (e.g., an announcing UE) broadcasts discovery beacons that indicate information associated with the first UE 115, and a second UE 115 (e.g., monitoring UE 115) that monitors for information included in discovery beacons received from announcing UEs. Additionally, or alternatively, Model-B discovery includes two roles for ProSe-enabled UEs 115, where a first UE 115 (e.g., discoverer UE) transmits a request that includes information regarding what types of devices the first UE 115 may be interested in discovering, and a second UE 115 (e.g., discoveree UE) may receive the request message and respond with information related to the request.

In some cases, the UEs 115 may perform EPC level discovery. For instance, UEs 115 may perform UE 115 registration for ProSe with a ProSe function that may be associated with a home public land mobile network (PLMN) of a respective UE 115. In accordance with EPC level discovery, a first UE 115 may send a proximity request to a first ProSe function that requests discovery information for a second UE 115 associated with a second ProSe function. In response, the first ProSe function may request location updates for the first UE 115 and the second UE 115. For requesting location updates for the first UE 115, the first ProSe function may contact a first secure user plane location (SUPL) location platform (SLP). For requesting location updates for the second UE 115, the first ProSe function may contact the second ProSe Function, which requests location updated for the second UE 115 from a second SLP associated with the second UE 115. In accordance with EPC level discovery, the location of the first UE 115 and the second UE 115 may be reported to the respective first and second ProSe functions periodically.

As such, multiple wireless devices may use ProSe based discovery (e.g., EPC level discovery) to enable direct communication between the wireless devices while refraining from using cellular network infrastructure. In some cases, however, implementation of ProSe based discovery may be less amenable for dynamic mobility or low latency scenarios. For example, the UE 115-*a* may be connected to the network entity 105-*a* (e.g., via a Uu link) and the UEs 115-*b*, 115-*c*, and 115-*d* may be serviced by the network entity 105-*b* (e.g., via respective Uu links). As illustrated in FIG. 2, network entity 105-*a* and 105-*b* may be associated with a same network 205 or different networks 205. If network entity 105-*a* is associated with a network 205-*a* and the network entity 105-*b* is associated with a network 205-*b*, then the UE 115-*a* and the UE 115-*b*, 115-*c*, and 115-*d* may be connected to different PLMNs. As such, ProSe functions communicating across multiple networks 205 may increase the latency associated with discovery. Such latency increases may be less amenable for dynamic mobility scenarios, such as if UE 115-*a* is a vehicle intending to discover other vehicles of pedestrian UEs 115. Additionally, or alternatively ProSe based discovery may be associated with LTE discovery techniques, which may not support cast types corresponding to 5G-NR based communications (e.g., groupcast or broadcast).

To reduce latency associated with ProSe based discovery, the wireless devices of FIG. 2 may operate in accordance with a V2N2X framework to initiate sidelink discovery. In some cases, a V2N2X framework may leverage Uu networks to provide V2X services. In accordance with V2N2X, the UE 115-*a* may transmit messages associated with sidelink to the network entity 105-*a* by using the associated Uu link, and the network entity 105-*a* may relay the messages to different network entities 105, different UEs 115, or both on behalf of the UE 115-*a*. By relaying messages associated with sidelink using a Uu link, the UE 115-*a* may refrain from accessing a ProSe function to communicate with UEs 115 spanning different networks 205. As such, a V2N2X framework may support the transmission of sidelink messaging (e.g., basic safety message (BSM), cooperative awareness message (CAM), decentralized environmental notification message (DENM), signal phase and timing mobility awareness packet (SPAT-MAP), among other examples) by leveraging Uu network techniques. Additionally, or alternatively, the V2N2X framework may support discontinuous reception (DRX) or paging for power saving, quality of service (QOS) techniques, unicast communications, connected groupcast protocols, distance based communication, connectionless groupcast techniques, feedback messaging, and sidelink messaging.

In some cases, the UE 115-*a* may use the V2N2X framework to perform sidelink discovery. For example, the UE 115-*a* may transmit a discovery message 210 to the network entity 105-*a*, and the network entity 105-*a* may relay the discovery message 210 to one or more second network entities 105 that service UEs 115 that neighbor the UE 115-*a*. In some examples, the discovery message 210 may include one or more parameters associated with the discovery initiated by the UE 115-*a*. For instance, the one or more parameters may indicate a discovery model type (e.g., Model-A or Model-B), a geographic range relative to the UE 115-*a*, a cast type associated with the discovery (e.g., unicast, connectionless groupcast, connected groupcast, broadcast, etc.), or a combination thereof. Additionally, or alternatively, the one or more parameters may indicate a reason for discovery. For instance, the UE 115-*a* may leverage a set of application codes configured for ProSe techniques, where the UE 115-*a* includes a ProSe application code in the discovery message 210 to indicate the reason for discovery.

In some examples, respective cast types may be associated with different geographic ranges relative to the UE 115-*a*. For instance, connectionless groupcast may be associated with a first geographic range (e.g., THR1 meters), connected groupcast may be associated with a second geographic range (e.g., THR2 meters), and unicast may be associated with a third geographic range. As such, the geographic range included in the discovery message 210 may be based on the cast type the UE 115 selects to perform the discovery.

In some cases, the UE 115-*a* may transmit the discovery message 210 via control signaling. For example, the UE 115-*a* may transmit the discovery message 210 as part of an RRC configuration message, an RRC reconfiguration message, a medium access control-control element (MAC-CE) message, or a scheduling request (SR) message.

In some cases, the UE 115-*a* may indicate the one or more parameters of the discovery message 210 via a discovery code. For example, each of the UEs 115 may store a pre-defined set of discovery codes, where each discovery code is associated with a respective set of parameters used for discovery. That is, the discovery message 210 may include a first discovery code that indicates the one or more parameters for discovery. In some examples, each UE 115 may receive the set of discovery codes from a servicing network entity 105 via control signaling (e.g., RRC, MAC-CE, or DCI). In some examples, each UE 115 may be pre-configured with the set of discovery codes.

In accordance with the V2N2X framework, the network entity 105-*a* may receive the discovery message 210 from the UE 115-*a* and relay the discovery message 210 to one or more second network entities 105 (e.g., via an X2 interface). In some cases, the network entity 105-*a* may transmit the discovery message 210 to second network entities 105 that satisfy the geographic range relative to the UE 115-*a*, as indicated in the discovery message 210. For instance, the network entity 105-*a* may relay the discovery message 210 to the network entity 105-*b* based on a geographic location of the network entity 105-*b* residing within the geographic range indicated by the UE 115. In some cases, the network entity 105-*a* may transmit the discovery message 210 to a quantity of second network entities 105 (e.g., quantity N) that are closest to the UE 115-a, where the quantity may be pre-configured at the network entity 105-a. For instance, the network entity 105-a may relay the discovery message 210 to the network entity 105-b based on the network entity 105-b being one of the N closest second network entities 105 to the UE 115-a. While FIG. 2 illustrates the network entity 105-a relaying the discovery message 210 to the network entity 105-b, it is understood that the network entity 105-a may relay the discovery message 210 to any quantity of second network entities 105 that satisfy the defined parameters of the discovery.

Based on receiving the discovery message 210, the network entity 105-b may signal the discovery message 210 the associated UEs 115 (e.g., UE 115-b, 115-c, and 115-d). In some examples, the network entity 105-b may indicate the presence or absence of a discovery message 210 in a downlink control channel (e.g., presence of discovery message indication 215). In some examples, the network entity 105-b may implicitly indicate the presence of discovery message indication 215. For instance, the network entity 105-b may transmit a DCI scrambled with a RNTI (e.g., a discovery RNTI). In some examples, the network entity 105-b may indicate the discovery RNTI to each of the UEs 115 via a system information (SI) message or an RRC message (e.g., RRC connection setup). As such, UE 115-b, 115-c, and 115-d may each decode the DCI using the discovery RNTI, where decoding the DCI indicates the presence of the discovery message 210 on a downlink channel associated with the DCI (e.g., a physical downlink shared channel (PDSCH)). In some examples, the network entity 105-b may periodically transmit the DCI scrambled with the discovery RNTI (e.g., once in N slots), where the periodicity may be pre-configured at the network entity 105-b.

In some examples, the network entity 105-b may explicitly transmit the presence of discovery message indication 215. For instance, the network entity 105-b may transmit a DCI that includes a bit value (e.g., as part of DCI formats 1, 1A, etc.), where a first value indicates the presence of a given discovery message 210 and a second value indicates an absence of a given discovery message 210. In some examples, the DCI that includes the bit value may additionally indicate the discovery message 210. For instance, the DCI may include the discovery code that indicates the one or more parameters associated with discovery by the UE 115-a. In some examples, the DCI that includes the bit value may indicate for the UEs 115 to receive the discovery message 210 on a corresponding downlink channel (e.g., a PDSCH associated with the DCI). In such examples, the network entity 105-b may transmit the discovery message 210 via the downlink channel indicated in the DCI.

In some examples, network entity 105-b may transmit the presence of discovery message indication 215 via RRC signaling. For example, the network entity 105-b may transmit during RRC reconfiguration a discovery message 210 indicator and the discovery code included in the discovery message 210. In such examples, the RRC signaling may further indicate the reason for RRC reconfiguration being based on V2N2X discovery.

Based on receiving the discovery message 210 from the network entity 105-b, a given UE 115 may determine whether the given UE 115 is available for discovery in accordance with the one or more parameters. For example, if the given UE 115 satisfies each of the one or more parameters indicated in the discovery message 210, the given UE 115 may transmit a discovery message response 220 that indicates the given UE 115 is available for discovery by the UE 115-a. If the given UE 115 does not satisfy each of the one or more parameters indicated in the discovery message 210, the given UE 115 may transmit a discovery message response 220 that indicates the given UE 115 is not available for discovery by the UE 115-a. In some cases, if the given UE 115 does not satisfy each of the one or more parameters indicated in the discovery message 210, the given UE 115 may refrain from transmitting a discovery message response 220. If the network entity 105-b does not receive the discovery message response 220 from the given UE 115, the network entity 105-b may determine that the given UE 115 is not available for discovery.

In the example illustrated in FIG. 2, each UE 115 serviced by the network entity 105-b may transmit a respective discovery message response 220 (e.g., UE 115-b, 115-c, and 115-d respectively transmit a discovery message response 220-a, 220-b, and 220-c). In some examples, a discovery message response 220 may indicate whether the associated UE 115 is available for discovery for the discovery code included in the discovery message 210, and may indicate an ID corresponding to the associated UE 115 (e.g., a V2X ID).

In some cases, a given UE 115 may determine a pseudo V2X ID in accordance with privacy preservation. In such cases, the given UE 115 may indicate for the network entity 105-b to use the pseudo V2X ID for communications related to discovery. For example, the UE 115-b may transmit a V2X ID mapping indication 225 to the network entity 105-b, which indicates a mapping between the V2X ID of the UE 115-b and a pseudo V2X ID. As such, the network entity 105-b may perform a pseudo V2X ID mapping procedure 230, where the network entity 105-b may use the pseudo V2X ID of the UE 115-b when performing communications associated with the UE 115-b.

Based on receiving the respective discovery message responses 220, the network entity 105-b may generate a discovery outcome message 235, that may indicate which of the UEs 115 serviced by the network entity 105-b are available for discovery by the UE 115-a in accordance with the one or more parameters. In some examples, the network entity 105-b may include the V2X ID associated with each of the available UEs 115 in the discovery outcome message 235. For instance, the discovery outcome message 235 may include the pseudo V2X ID for UE 115-b, a V2X ID for UE 115-c, and a V2X ID for UE 115-d. As such, the network entity 105-b may transmit the discovery outcome message 235 to the network entity 105-a.

The network entity 105-a may receive a respective discovery outcome message 235 from each of the second network entities 105 the network entity 105-a transmits the discovery message 210 to. In some examples, the network entity 105-a may combine the V2X IDs included in each respective discovery outcome message 235 into a single V2X ID list, which indicates each of the available UEs 115 across all of the second network entities 105. As such, the network entity 105-a may transmit to the UE 115-a a V2N2X discovery outcome message 240 that includes the single V2X ID list. In some examples, the UE 115-a may perform a wireless connection setup procedure with one or more of the UEs 115 indicated in the V2N2X discovery outcome message 240.

Figure 3:
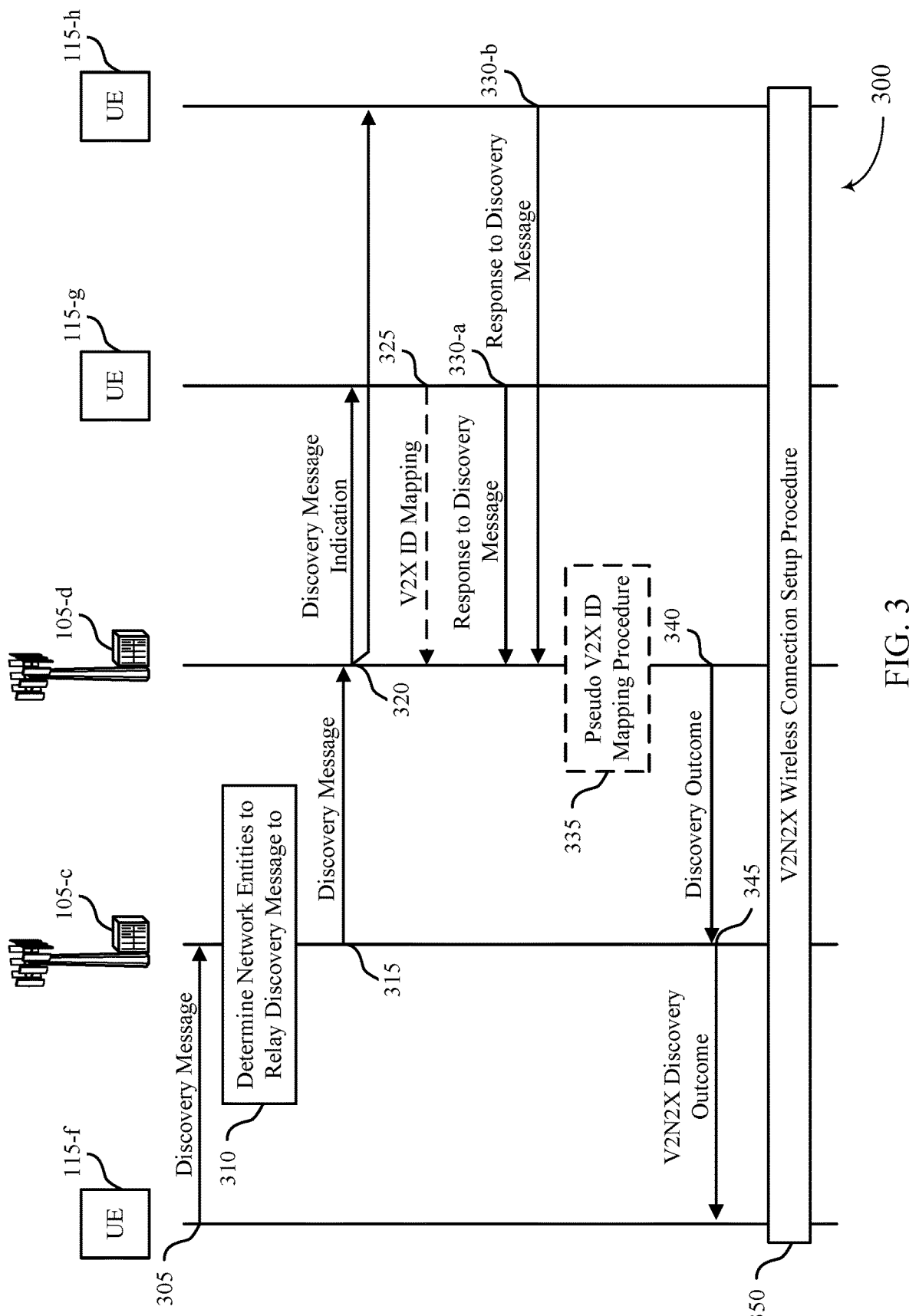
FIG. 3 shows an example of a process flow that supports techniques for sidelink based discovery in accordance with one or more aspects of the present disclosure.

FIG. 3 shows an example of a process flow 300 that supports techniques for sidelink based discovery in accordance with one or more aspects of the present disclosure. In some examples, process flow 300 may implement aspects of wireless communications system 100 and 200. Process flow 300 includes a UE 115-f which may be an example of a UE 115 transmitting a discovery message 210 (e.g., an announcing UE for Model-A discovery or a UE 115-*f* for Model-B discovery). Additionally, UE 115-*g* and a UE 115-*h* may be respective examples of UEs 115 receiving a discovery message (e.g., a monitoring UE for Model-A discovery or a discoveree UE for Model-B discovery). In some examples, the UE 115-*f* may be serviced by a network entity 105-*c* and the UE 115-*g* and 115-*h* may be serviced by a network entity 105-*d*, where network entity 105-*c* and 105-*d* are respective examples of network entities 105, as described with reference to FIGS. 1 and 2. In some examples, the network entity 105-*c* and 105-*d* may be associated with a same network or different networks. Alternative examples of the following may be implemented, where some steps are performed in a different order than described or are not performed at all. In some cases, steps may include additional features not mentioned below, or further steps may be added. In addition, while process flow 300 shows processes between multiple wireless devices, it should be understood that these processes may occur between any quantity of network devices and network device types.

At 305, the UE 115-*f* may transmit to network entity 105-*c*, a discovery message requesting information for discovery of UEs 115 for sidelink communication. In some examples, the discovery message may include one or more parameters that indicate a discovery model type, a geographic range relative to the UE 115-*f*, a cast type, or a combination thereof.

In some examples, the cast type may include a set of cast types, where the geographic range includes a set of geographic ranges, and each of the set of cast types is associated with a respective geographic range of the set of geographic ranges. In some examples, the discovery message may include a first discovery code that indicates the one or more parameters, and the UE 115-*f* may be associated with a set of discovery codes that each correspond to a respective set of the one or more parameters. In some examples, the one or more parameters further indicate a reason for discovery by the UE 115-*f* (e.g., V2N2X Discovery). In some examples, the discovery message may be transmitted via an RRC configuration message, an RRC reconfiguration message, a MAC-CE message, or an SR message.

At 310, the network entity 105-*c* may determine one or more second network entities 105 to transmit the discovery message to. In some examples, the one or more second network entities 105 may satisfy the geographic range relative to the UE 115-*f*, as indicated in the discovery message. In some examples, the one or more second network entities 105 may satisfy a quantity of second network entities closest to the UE 115-*f*. As illustrated in FIG. 3, the network entity 105-*c* may determine to transmit the discovery message to at least network entity 105-*d*. However, it is understood that the network entity 105-*d* may determine to transmit the discovery message to additional second network entities 105 not illustrated in FIG. 3.

At 315, the network entity 105-*c* may transmit the discovery message received from UE 115-*f* to the one or more second network entities 105 (e.g., which at least includes network entity 105-*d*). In some examples, the network entity 105-*c* may communicate with the network entity 105-*d* via an X2 interface.

At 320, the UE 115-*g* and 115-*h* may receive from network entity 105-*d*, an indication of the presence of the discovery message requesting information associated with establishing sidelink communication with a UE 115-*f*.

In some cases, the UE 115-*g* and 115-*h* may receive a DCI scrambled with a RNTI associated with sidelink discovery, and decode the DCI using the RNTI, where a result of the decoding indicates that an associated downlink channel includes the discovery message. As such, the UE 115-*g* and 115-*h* may receive, via the associated downlink channel, the first discovery code that indicates the one or more parameters of the discovery message. In some cases, the UE 115-*g* and 115-*h* may receive, prior to receiving the DCI, an indication of the RNTI associated with sidelink discovery. As such, decoding the DCI may be based on receiving the indication of the RNTI. In some examples, the UE 115-*g* and 115-*h* may periodically monitor for the DCI scrambled with the RNTI associated with sidelink discovery.

In some cases, the UE 115-*g* and 115-*h* may receive a DCI that includes a bit value indicating a presence of the discovery message and the first discovery code indicating the one or more parameters of the discovery message.

In some cases, the UE 115-*g* and 115-*h* may receive a DCI comprising a bit value that indicates that an associated downlink channel includes the discovery message. As such, the UE 115-*g* and 115-*h* may receive via the associated downlink channel, the first discovery code that indicates the one or more parameters of the discovery message.

In some cases, the UE 115-*g* and 115-*h* may receive an RRC reconfiguration message that includes a discovery message indicator that indicates a presence of the discovery message, the first discovery code that indicates the one or more parameters of the discovery message, and the reason for discovery by the UE 115-*f*.

In some examples, at 325, one or more of the UE 115-*g* and 115-*h* may indicate to the network entity 105-*d* a mapping between a pseudo V2X ID and a V2X ID. For example, the UE 115-*g* may transmit the mapping which indicates for the network entity 105-*d* to relay the pseudo V2X ID to the UE 115-*f* as part of the response to the discovery message.

At 330, the UE 115-*g* and 115-*h* may each transmit a respective response to the discovery message indicating whether the respective UE 115 is available for discovery by the UE 115-*f* in accordance with the one or more parameters indicated in the discovery message. For instance at 330-*a*, the UE 115-*g* may transmit a response to the discovery message, and at 330-*b* the UE 115-*h* transmits a response to the discovery message. In some examples, each respective response to the discovery message may indicate an availability to be discovered by the UE 115-*f* according to the one or more parameters indicated in the discovery message, and indicate a the V2X ID associated with the respective UE 115.

In some examples, at 335, the network entity 105-*d* may perform a pseudo mapping V2X procedure. For example, if at 325, the UE 115-*g* indicates the V2X ID mapping, the network entity 105-*d* may include the pseudo V2X ID for UE 115-*g* in a list of UEs 115 that satisfy the criteria for the discovery.

At 340, the network entity 105-*d* may transmit to the network entity 105-*c*, the list of UEs 115 of the one or more serviced UEs 115 that satisfy criteria for the discovery for the sidelink communication according to the one or more parameters. In some examples, the network entity 105-*c* may receive a respective response to the discovery message from each of the one or more second network entities 105, that includes respective list of one or more of the UEs 115 that satisfy criteria for the discovery for the sidelink communication according to the one or more parameters. As such, the network entity 105-*c* may create a single list of UEs 115 that includes each of the one or more UEs 115 that satisfy criteria for the discovery indicated in the respective lists received from each of the second network entities 105.

At 345, the network entity 105-*c* may transmit a control message (e.g., an RRC message) that comprises the single list of the UEs 115 that satisfy criteria for the discovery for the sidelink communication according to the one or more parameters (e.g., a V2N2X discovery outcome). In some examples, the single list included in the V2N2X discovery outcome indicates a respective V2X ID for each UE 115 included om the single list.

At 350, the UE 115-*f* may perform, with at least one UE 115 from the list of one or more of the UEs 115, a wireless connection setup procedure in accordance with the one or more parameters. For example, the UE 115-*f* may perform a wireless connection setup procedure with UE 115-*g*, UE 115-*h*, or both. The UE 115-*f* may use the respective V2X IDs included in the V2N2X discovery outcome to perform each respective wireless connection setup procedure.

Figure 4:
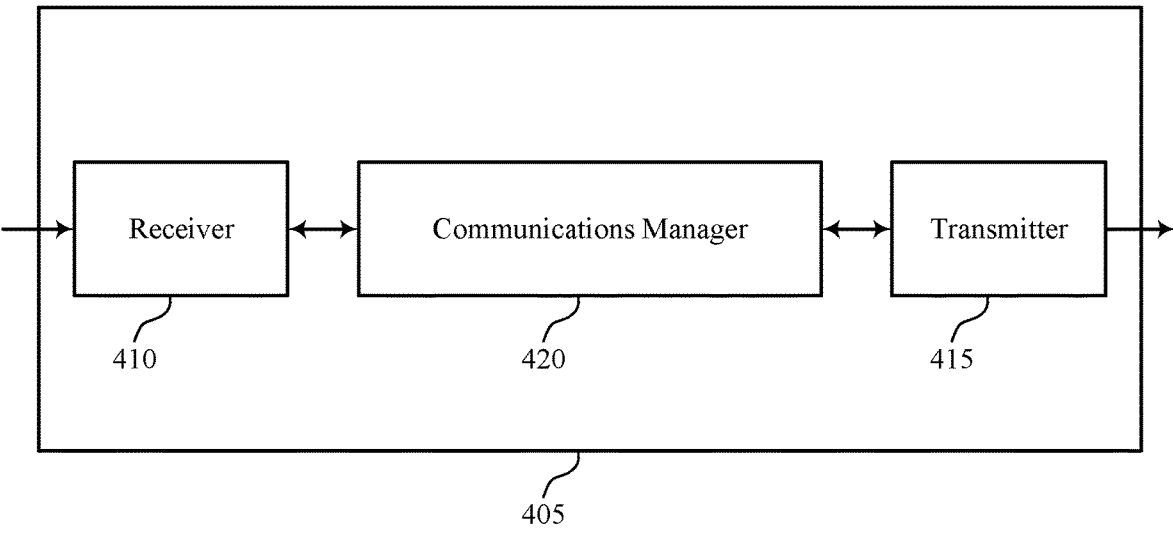
FIGS. 4 and 5 show block diagrams of devices that support techniques for sidelink based discovery in accordance with one or more aspects of the present disclosure.

FIG. 4 shows a block diagram 400 of a device 405 that supports techniques for sidelink based discovery in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for sidelink based discovery). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for sidelink based discovery). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for sidelink based discovery as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for transmitting, to a network entity, a discovery message requesting information for discovery of discoveree UEs for sidelink communication, the discovery message including one or more parameters that indicate a discovery model type, a geographic range relative to the discoverer UE, a cast type, or a combination thereof. The communications manager 420 is capable of, configured to, or operable to support a means for receiving, from the network entity, a response to the discovery message indicating a list of one or more of the discoveree UEs that satisfy criteria for the discovery for the sidelink communication according to the one or more parameters. The communications manager 420 is capable of, configured to, or operable to support a means for performing, with at least one UE from the list of one or more of the discoveree UEs, a wireless connection setup procedure in accordance with the one or more parameters.

Additionally, or alternatively, the communications manager 420 may support wireless communications in accordance with examples as disclosed herein. For example, the communications manager 420 is capable of, configured to, or operable to support a means for receiving, from a network entity, a discovery message requesting information associated with establishing sidelink communication with a discoverer UE, the discovery message including one or more parameters that indicate a discovery model type, a geographic range relative to the discoverer UE, a cast type, or a combination thereof. The communications manager 420 is capable of, configured to, or operable to support a means for transmitting, to the network entity, a response to the discovery message indicating whether the discoveree UE is available for discovery by the discoverer UE in accordance with the one or more parameters indicated in the discovery message.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for more efficient utilization of communication resources, reduced latency, and increase in signal quality for mobility scenarios.

Figure 5:
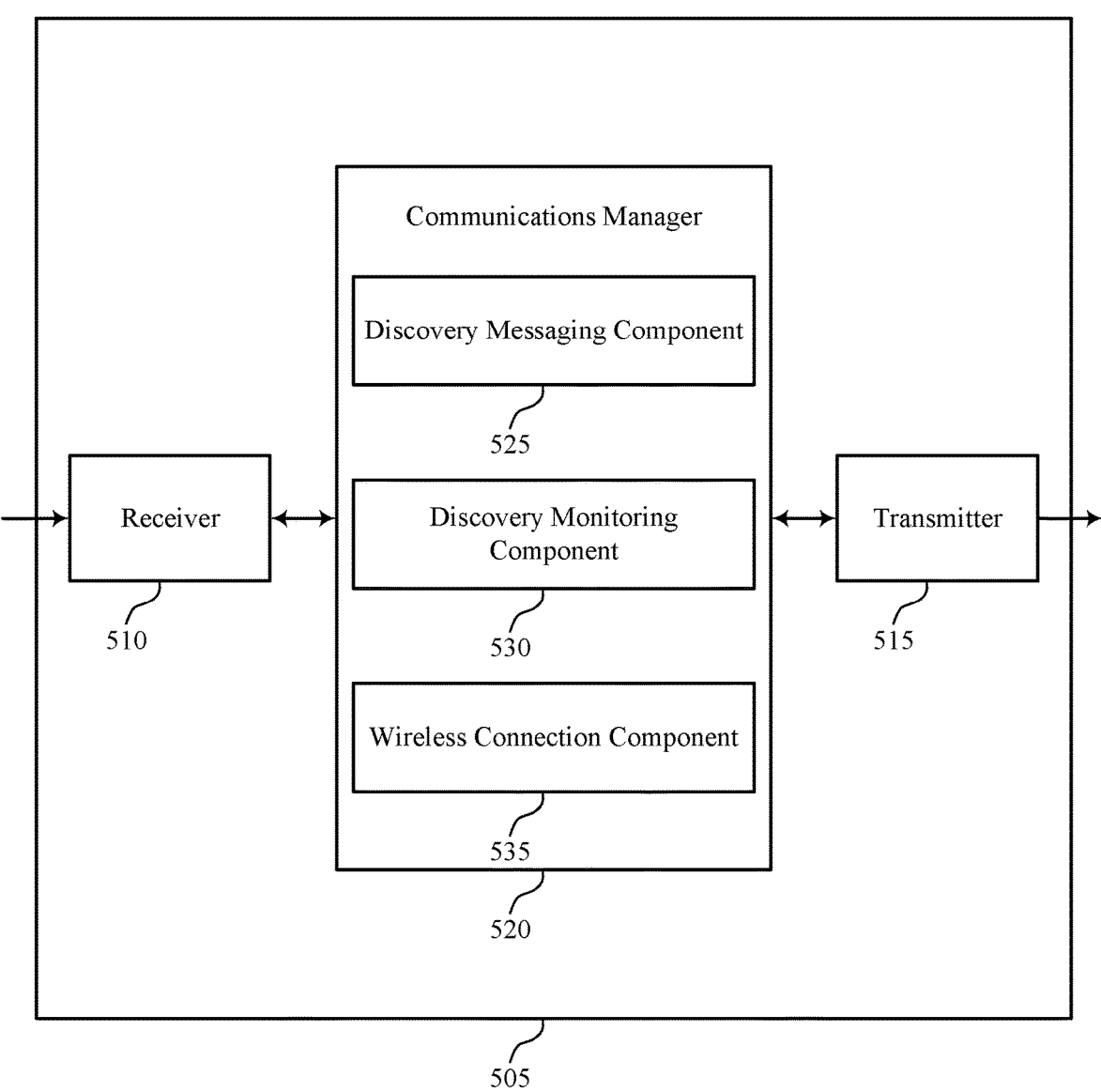

FIG. 5 shows a block diagram 500 of a device 505 that supports techniques for sidelink based discovery in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sidelink based discovery). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sidelink based discovery). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for sidelink based discovery as described herein. For example, the communications manager 520 may include a discovery messaging component 525, a discovery monitoring component 530, a wireless connection component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The discovery messaging component 525 is capable of, configured to, or operable to support a means for transmitting, to a network entity, a discovery message requesting information for discovery of discoveree UEs for sidelink communication, the discovery message including one or more parameters that indicate a discovery model type, a geographic range relative to the discoverer UE, a cast type, or a combination thereof. The discovery monitoring component 530 is capable of, configured to, or operable to support a means for receiving, from the network entity, a response to the discovery message indicating a list of one or more of the discoveree UEs that satisfy criteria for the discovery for the sidelink communication according to the one or more parameters. The wireless connection component 535 is capable of, configured to, or operable to support a means for performing, with at least one UE from the list of one or more of the discoveree UEs, a wireless connection setup procedure in accordance with the one or more parameters.

Additionally, or alternatively, the communications manager 520 may support wireless communications in accordance with examples as disclosed herein. The discovery monitoring component 530 is capable of, configured to, or operable to support a means for receiving, from a network entity, a discovery message requesting information associated with establishing sidelink communication with a discoverer UE, the discovery message including one or more parameters that indicate a discovery model type, a geographic range relative to the discoverer UE, a cast type, or a combination thereof. The discovery messaging component 525 is capable of, configured to, or operable to support a means for transmitting, to the network entity, a response to the discovery message indicating whether the discoveree UE is available for discovery by the discoverer UE in accordance with the one or more parameters indicated in the discovery message.

Figure 6:
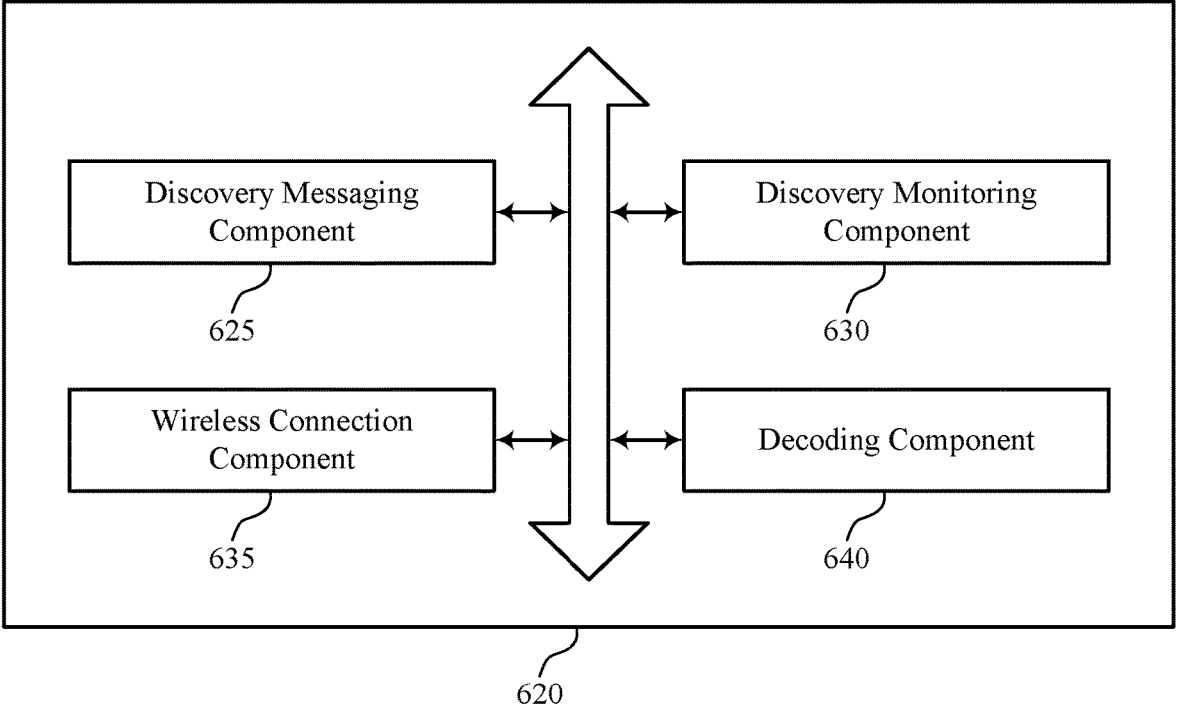
FIG. 6 shows a block diagram of a communications manager that supports techniques for sidelink based discovery in accordance with one or more aspects of the present disclosure.

FIG. 6 shows a block diagram 600 of a communications manager 620 that supports techniques for sidelink based discovery in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for sidelink based discovery as described herein. For example, the communications manager 620 may include a discovery messaging component 625, a discovery monitoring component 630, a wireless connection component 635, a decoding component 640, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The discovery messaging component 625 is capable of, configured to, or operable to support a means for transmitting, to a network entity, a discovery message requesting information for discovery of discoveree UEs for sidelink communication, the discovery message including one or more parameters that indicate a discovery model type, a geographic range relative to the discoverer UE, a cast type, or a combination thereof. The discovery monitoring component 630 is capable of, configured to, or operable to support a means for receiving, from the network entity, a response to the discovery message indicating a list of one or more of the discoveree UEs that satisfy criteria for the discovery for the sidelink communication according to the one or more parameters. The wireless connection component 635 is capable of, configured to, or operable to support a means for performing, with at least one UE from the list of one or more of the discoveree UEs, a wireless connection setup procedure in accordance with the one or more parameters.

In some examples, the cast type includes a set of multiple cast types and. In some examples, the geographic range includes a set of multiple geographic ranges. In some examples, each of the set of multiple cast types is associated with a respective geographic range of the set of multiple geographic ranges.

In some examples, the discovery message includes a first discovery code that indicates the one or more parameters. In some examples, the discoverer UE is associated with a set of discovery codes that each correspond to a respective set of the one or more parameters.

In some examples, the one or more parameters further indicate a reason for discovery by the discoverer UE.

In some examples, the discoverer UE is associated with the network entity and the one or more of the discoveree UEs are associated with one or more second network entities.

In some examples, the discovery message is transmitted via a RRC configuration message, a RRC reconfiguration message, a MAC-CE message, or an SR message.

In some examples, the response to the discovery message further indicates a respective V2X identifier for each discoveree UE of the list of one or more of the discoveree UEs.

In some examples, the discoverer UE receives the response to the discovery message via a RRC message.

Additionally, or alternatively, the communications manager 620 may support wireless communications in accordance with examples as disclosed herein. In some examples, the discovery monitoring component 630 is capable of, configured to, or operable to support a means for receiving, from a network entity, a discovery message requesting information associated with establishing sidelink communication with a discoverer UE, the discovery message including one or more parameters that indicate a discovery model type, a geographic range relative to the discoverer UE, a cast type, or a combination thereof. In some examples, the discovery messaging component 625 is capable of, configured to, or operable to support a means for transmitting, to the network entity, a response to the discovery message indicating whether the discoveree UE is available for discovery by the discoverer UE in accordance with the one or more parameters indicated in the discovery message.

In some examples, the discovery monitoring component 630 is capable of, configured to, or operable to support a means for receiving DCI scrambled with a RNTI associated with sidelink discovery. In some examples, the decoding component 640 is capable of, configured to, or operable to support a means for decoding the DCI using the RNTI, where a result of the decoding indicates that an associated downlink channel includes the discovery message.

In some examples, the discovery monitoring component 630 is capable of, configured to, or operable to support a means for receiving, prior to receiving the DCI, an indication of the RNTI associated with sidelink discovery, where decoding the DCI is based on receiving the indication of the RNTI.

In some examples, to support receiving the discovery message, the discovery monitoring component 630 is capable of, configured to, or operable to support a means for receiving, via the associated downlink channel, a discovery code that indicates the one or more parameters of the discovery message.

In some examples, the discoveree UE periodically monitors for the DCI scrambled with the RNTI associated with sidelink discovery.

In some examples, the discovery monitoring component 630 is capable of, configured to, or operable to support a means for receiving DCI including a bit value that indicates a presence of the discovery message and a discovery code that indicates the one or more parameters of the discovery message.

In some examples, the discovery monitoring component 630 is capable of, configured to, or operable to support a means for receiving DCI including a bit value that indicates that an associated downlink channel includes the discovery message. In some examples, the discovery monitoring component 630 is capable of, configured to, or operable to support a means for receiving the discovery message includes receiving, via the associated downlink channel, a discovery code that indicates the one or more parameters of the discovery message.

In some examples, to support receiving the discovery message, the discovery monitoring component 630 is capable of, configured to, or operable to support a means for receiving a RRC reconfiguration message that includes receiving the discovery message. In some examples, to support receiving the discovery message, the discovery monitoring component 630 is capable of, configured to, or operable to support a means for a discovery message indicator that indicates a presence of the discovery message. In some examples, to support receiving the discovery message, the discovery monitoring component 630 is capable of, configured to, or operable to support a means for a discovery code that indicates the one or more parameters of the discovery message. In some examples, to support receiving the discovery message, the discovery monitoring component 630 is capable of, configured to, or operable to support a means for a reason for discovery by the discoverer UE.

In some examples, to support transmitting the response to the discovery message, the discovery messaging component 625 is capable of, configured to, or operable to support a means for transmitting, as part of the response to the discovery message, an availability to be discovered by the discoverer UE according to the one or more parameters indicated in the discovery message and a first V2X identifier associated with the discoveree UE.

In some examples, the discovery messaging component 625 is capable of, configured to, or operable to support a means for transmitting, to the network entity, a mapping between a pseudo V2X identifier and the first V2X identifier, where the mapping indicates for the network entity to relay the pseudo V2X identifier to the discoverer UE as part of the response to the discovery message.

In some examples, the discoverer UE is associated with a second network entity different than the network entity associated with the discoveree UE.

Figure 7:
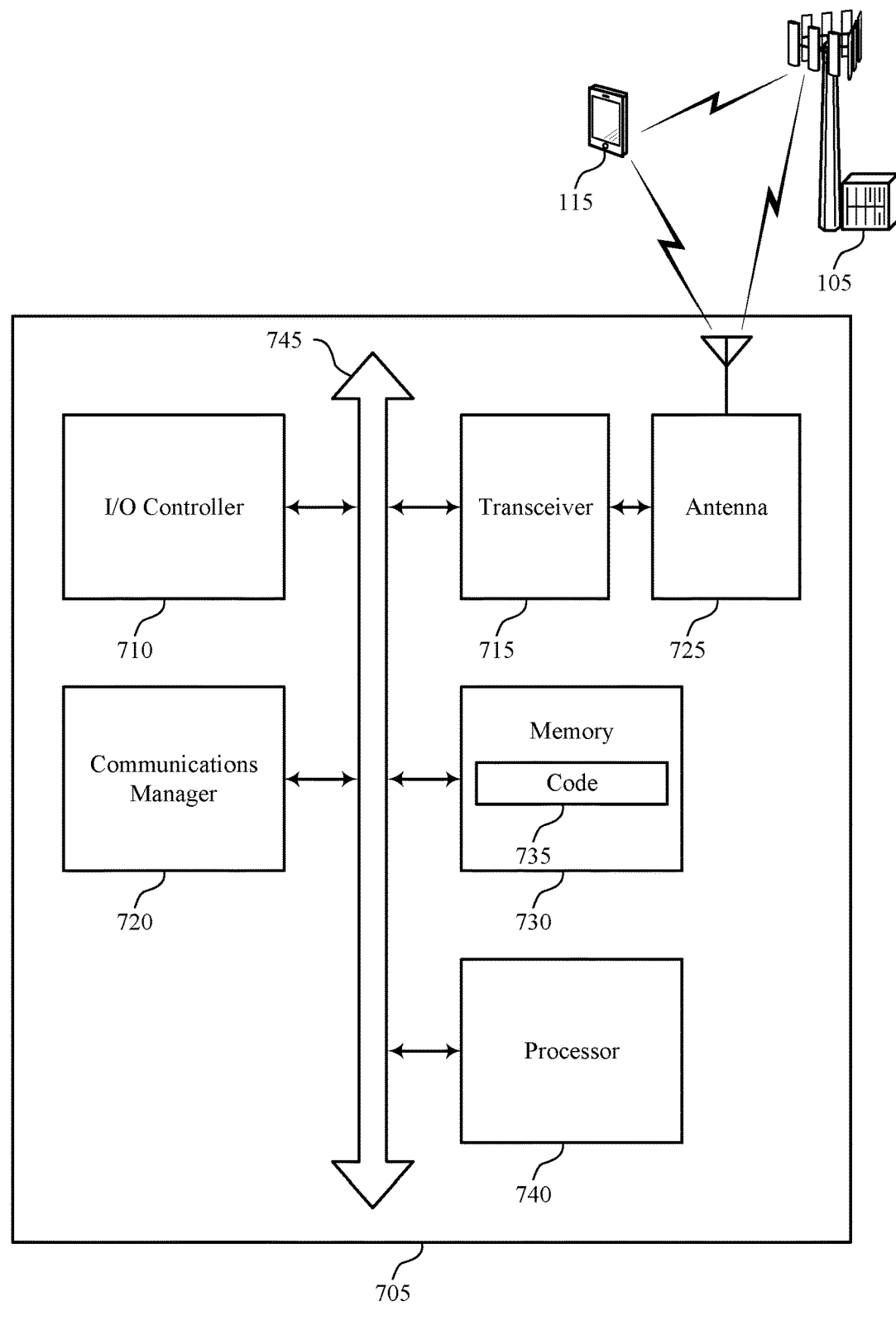
FIG. 7 shows a diagram of a system including a device that supports techniques for sidelink based discovery in accordance with one or more aspects of the present disclosure.

FIG. 7 shows a diagram of a system 700 including a device 705 that supports techniques for sidelink based discovery in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting techniques for sidelink based discovery). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for transmitting, to a network entity, a discovery message requesting information for discovery of discoveree UEs for sidelink communication, the discovery message including one or more parameters that indicate a discovery model type, a geographic range relative to the discoverer UE, a cast type, or a combination thereof. The communications manager 720 is capable of, configured to, or operable to support a means for receiving, from the network entity, a response to the discovery message indicating a list of one or more of the discoveree UEs that satisfy criteria for the discovery for the sidelink communication according to the one or more parameters. The communications manager 720 is capable of, configured to, or operable to support a means for performing, with at least one UE from the list of one or more of the discoveree UEs, a wireless connection setup procedure in accordance with the one or more parameters.

Additionally, or alternatively, the communications manager 720 may support wireless communications in accordance with examples as disclosed herein. For example, the communications manager 720 is capable of, configured to, or operable to support a means for receiving, from a network entity, a discovery message requesting information associated with establishing sidelink communication with a discoverer UE, the discovery message including one or more parameters that indicate a discovery model type, a geographic range relative to the discoverer UE, a cast type, or a combination thereof. The communications manager 720 is capable of, configured to, or operable to support a means for transmitting, to the network entity, a response to the discovery message indicating whether the discoveree UE is available for discovery by the discoverer UE in accordance with the one or more parameters indicated in the discovery message.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of techniques for sidelink based discovery as described herein, or the at least one processor 740 and the at least one memory 730 may be otherwise configured to, individually or collectively, perform or support such operations.

Figure 8:
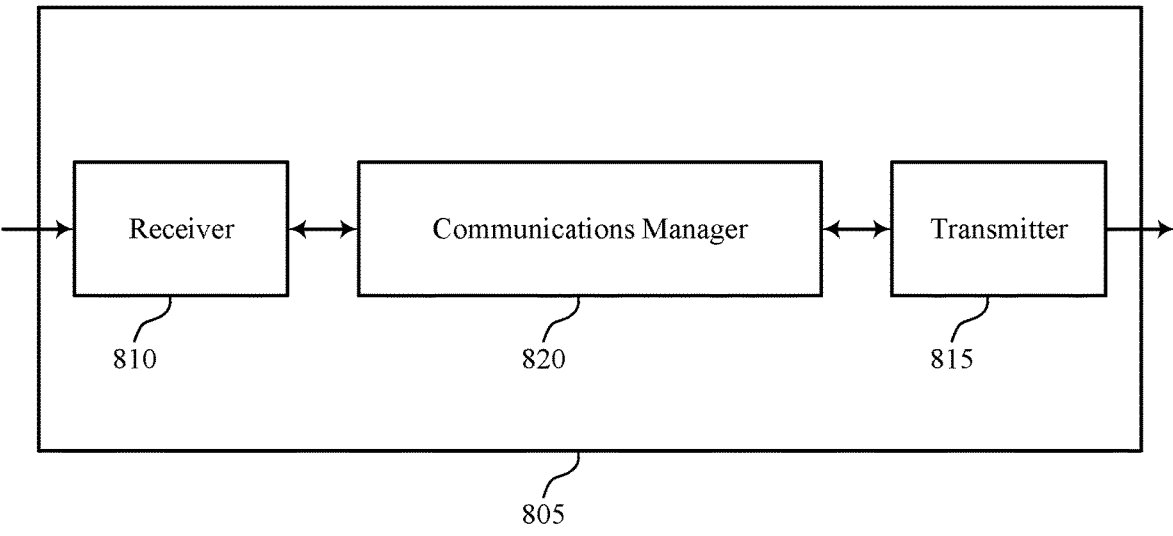
FIGS. 8 and 9 show block diagrams of devices that support techniques for sidelink based discovery in accordance with one or more aspects of the present disclosure.

FIG. 8 shows a block diagram 800 of a device 805 that supports techniques for sidelink based discovery in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for sidelink based discovery as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof. The communications manager 820 is capable of, configured to, or operable to support a means for transmitting, to one or more second network entities, the discovery message received from the discoverer UE. The communications manager 820 is capable of, configured to, or operable to support a means for receiving, from the one or more second network entities, a respective response to the discovery message indicating a respective list of one or more of the discoveree UEs that satisfy criteria for the discovery for the sidelink communication according to the one or more parameters. The communications manager 820 is capable of, configured to, or operable to support a means for transmitting, to the discoverer UE, a control message that includes a list of the discoveree UEs that satisfy criteria for the discovery for the sidelink communication according to the one or more parameters.

Additionally, or alternatively, the communications manager 820 may support wireless communications in accordance with examples as disclosed herein. For example, the communications manager 820 is capable of, configured to, or operable to support a means for receiving, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof. The communications manager 820 is capable of, configured to, or operable to support a means for transmitting a second discovery message to one or more discoveree UEs served by the network entity, the second discovery message including the one or more parameters. The communications manager 820 is capable of, configured to, or operable to support a means for receiving, from the one or more discoveree UEs, respective responses to the second discovery message indicating whether the respective discoveree UEs are available for discovery by the discoverer UE in accordance with the one or more parameters indicated in the second discovery message. The communications manager 820 is capable of, configured to, or operable to support a means for transmitting, to the second network entity, a list of discoveree UEs of the one or more discoveree UEs that satisfy criteria for the discovery for the sidelink communication according to the one or more parameters.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for more efficient utilization of communication resources, reduced latency, and increase in signal quality for mobility scenarios.

Figure 9:
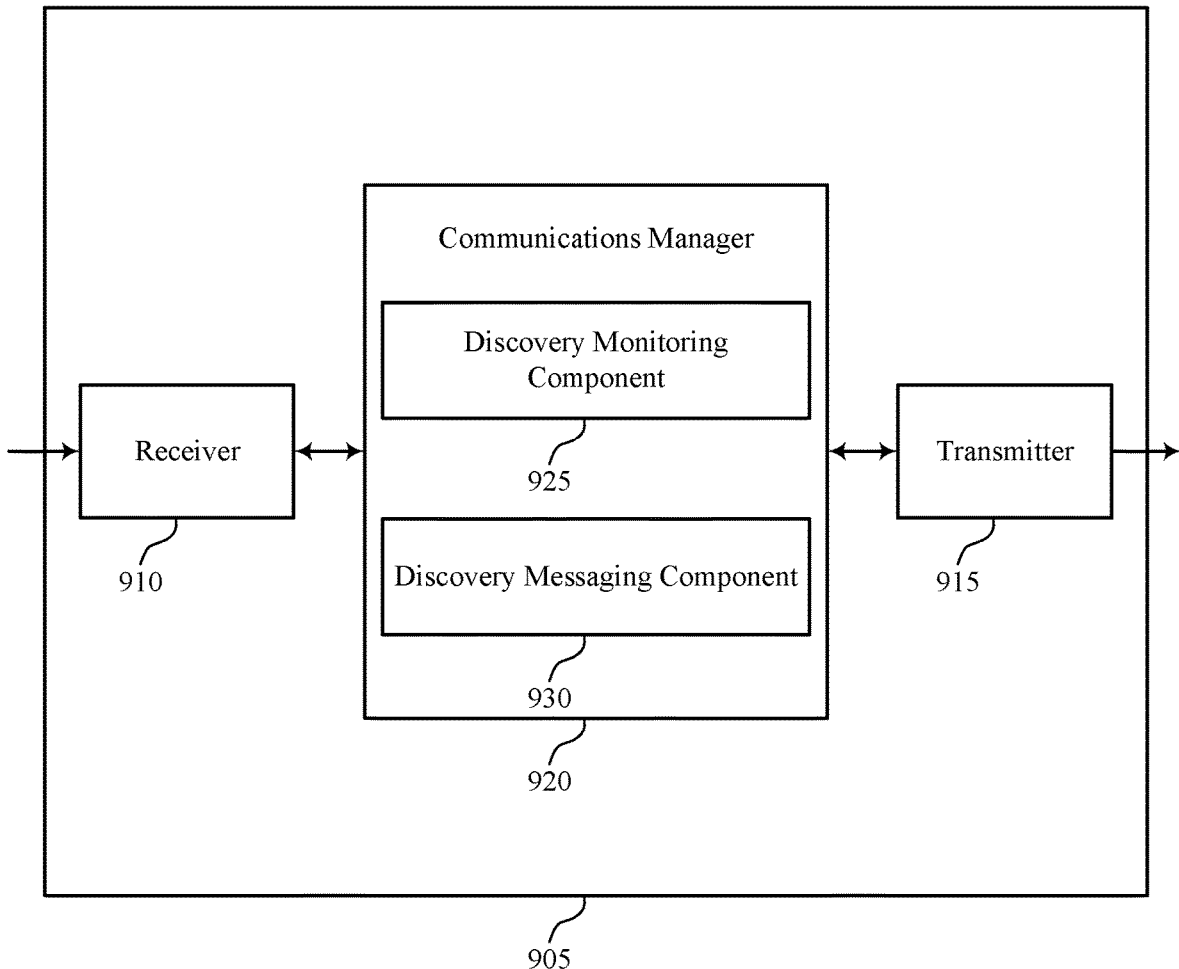

FIG. 9 shows a block diagram 900 of a device 905 that supports techniques for sidelink based discovery in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for sidelink based discovery as described herein. For example, the communications manager 920 may include a discovery monitoring component 925 a discovery messaging component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The discovery monitoring component 925 is capable of, configured to, or operable to support a means for receiving, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof. The discovery messaging component 930 is capable of, configured to, or operable to support a means for transmitting, to one or more second network entities, the discovery message received from the discoverer UE. The discovery monitoring component 925 is capable of, configured to, or operable to support a means for receiving, from the one or more second network entities, a respective response to the discovery message indicating a respective list of one or more of the discoveree UEs that satisfy criteria for the discovery for the sidelink communication according to the one or more parameters. The discovery messaging component 930 is capable of, configured to, or operable to support a means for transmitting, to the discoverer UE, a control message that includes a list of the discoveree UEs that satisfy criteria for the discovery for the sidelink communication according to the one or more parameters.

Additionally, or alternatively, the communications manager 920 may support wireless communications in accordance with examples as disclosed herein. The discovery monitoring component 925 is capable of, configured to, or operable to support a means for receiving, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof. The discovery messaging component 930 is capable of, configured to, or operable to support a means for transmitting a second discovery message to one or more discoveree UEs served by the network entity, the second discovery message including the one or more parameters. The discovery monitoring component 925 is capable of, configured to, or operable to support a means for receiving, from the one or more discoveree UEs, respective responses to the second discovery message indicating whether the respective discoveree UEs are available for discovery by the discoverer UE in accordance with the one or more parameters indicated in the second discovery message. The discovery messaging component 930 is capable of, configured to, or operable to support a means for transmitting, to the second network entity, a list of discoveree UEs of the one or more discoveree UEs that satisfy criteria for the discovery for the sidelink communication according to the one or more parameters.

FIG. 10 shows a block diagram 1000 of a communications manager 1020 that supports techniques for sidelink based discovery in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for sidelink based discovery as described herein. For example, the communications manager 1020 may include a discovery monitoring component 1025, a discovery messaging component 1030, an identifier mapping component 1035, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The discovery monitoring component 1025 is capable of, configured to, or operable to support a means for receiving, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof. The discovery messaging component 1030 is capable of, configured to, or operable to support a means for transmitting, to one or more second network entities, the discovery message received from the discoverer UE. In some examples, the discovery monitoring component 1025 is capable of, configured to, or operable to support a means for receiving, from the one or more second network entities, a respective response to the discovery message indicating a respective list of one or more of the discoveree UEs that satisfy criteria for the discovery for the sidelink communication according to the one or more parameters. In some examples, the discovery messaging component 1030 is capable of, configured to, or operable to support a means for transmitting, to the discoverer UE, a control message that includes a list of the discoveree UEs that satisfy criteria for the discovery for the sidelink communication according to the one or more parameters.

In some examples, the one or more second network entities satisfy the geographic range relative to the discoverer UE.

In some examples, the one or more second network entities satisfy a quantity second network entities closest to the discoverer UE.

In some examples, the control message is a RRC message for a vehicle-to-network-to-everything discovery outcome and the list indicates a respective V2X identifier for each of the discoveree UEs.

Additionally, or alternatively, the communications manager 1020 may support wireless communications in accordance with examples as disclosed herein. In some examples, the discovery monitoring component 1025 is capable of, configured to, or operable to support a means for receiving, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof. In some examples, the discovery messaging component 1030 is capable of, configured to, or operable to support a means for transmitting a second discovery message to one or more discoveree UEs served by the network entity, the second discovery message including the one or more parameters. In some examples, the discovery monitoring component 1025 is capable of, configured to, or operable to support a means for receiving, from the one or more discoveree UEs, respective responses to the second discovery message indicating whether the respective discoveree UEs are available for discovery by the discoverer UE in accordance with the one or more parameters indicated in the second discovery message. In some examples, the discovery messaging component 1030 is capable of, configured to, or operable to support a means for transmitting, to the second network entity, a list of discoveree UEs of the one or more discoveree UEs that satisfy criteria for the discovery for the sidelink communication according to the one or more parameters.

In some examples, each respective response to the second discovery message includes a respective V2X identifier associated with a respective discoveree UE. In some examples, the list of discoveree UEs that satisfy the criteria for the discovery includes each respective V2X identifier.

In some examples, the identifier mapping component 1035 is capable of, configured to, or operable to support a means for receiving, from a first discoveree UE of the one or more discoveree UEs, a mapping between a pseudo V2X identifier and a V2X identifier, where the mapping indicates for the network entity to include the pseudo V2X identifier in the list of discoveree UEs that satisfy the criteria for the discovery.

In some examples, the network entity transmits the list of discoveree UEs that satisfy the criteria for the discovery via an X2 interface.

Figure 11:
FIG. 11 shows a diagram of a system including a device that supports techniques for sidelink based discovery in accordance with one or more aspects of the present disclosure.

FIG. 11 shows a diagram of a system 1100 including a device 1105 that supports techniques for sidelink based discovery in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired inter-faces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., opera-tively, communicatively, functionally, electronically, electri-cally) via one or more buses (e.g., a bus 1140).

The transceiver 1110 may support bi-directional commu-nications via wired links, wireless links, or both as described herein. In some examples, the transceiver 1110 may include a wired transceiver and may communicate bi-directionally with another wired transceiver. Additionally, or alterna-tively, in some examples, the transceiver 1110 may include a wireless transceiver and may communicate bi-direction-ally with another wireless transceiver. In some examples, the device 1105 may include one or more antennas 1115, which may be capable of transmitting or receiving wireless trans-missions (e.g., concurrently). The transceiver 1110 may also include a modem to modulate signals, to provide the modu-lated signals for transmission (e.g., by one or more antennas 1115, by a wired transmitter), to receive modulated signals (e.g., from one or more antennas 1115, from a wired receiver), and to demodulate signals. In some implementa-tions, the transceiver 1110 may include one or more inter-faces, such as one or more interfaces coupled with the one or more antennas 1115 that are configured to support various receiving or obtaining operations, or one or more interfaces coupled with the one or more antennas 1115 that are con-figured to support various transmitting or outputting opera-tions, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individu-ally or collectively, be configured to perform various func-tions herein (for example, as part of a processing system).

The at least one processor 1135 may include an intelligent hardware device (e.g., a general-purpose processor, a DSP, an ASIC, a CPU, an FPGA, a microcontroller, a program-mable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting techniques for sidelink based discovery). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be con-figured to perform various functions herein. In some examples, the at least one processor 1135 may be a com-ponent of a processing system, which may refer to a system (such as a series) of machines, circuitry (including, for example, one or both of processor circuitry (which may include the at least one processor 1135) and memory cir-cuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for receiving, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof. The communications manager 1120 is capable of, configured to, or operable to support a means for transmitting, to one or more second network entities, the discovery message received from the discoverer UE. The communications manager 1120 is capable of, configured to, or operable to support a means for receiving, from the one or more second network entities, a respective response to the discovery message indicating a respective list of one or more of the discoveree UEs that satisfy criteria for the discovery for the sidelink communication according to the one or more parameters. The communications manager 1120 is capable of, configured to, or operable to support a means for transmitting, to the discoverer UE, a control message that includes a list of the discoveree UEs that satisfy criteria for the discovery for the sidelink communication according to the one or more parameters.

Additionally, or alternatively, the communications manager 1120 may support wireless communications in accordance with examples as disclosed herein. For example, the communications manager 1120 is capable of, configured to, or operable to support a means for receiving, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof. The communications manager 1120 is capable of, configured to, or operable to support a means for transmitting a second discovery message to one or more discoveree UEs served by the network entity, the second discovery message including the one or more parameters. The communications manager 1120 is capable of, configured to, or operable to support a means for receiving, from the one or more discoveree UEs, respective responses to the second discovery message indicating whether the respective discoveree UEs are available for discovery by the discoverer UE in accordance with the one or more parameters indicated in the second discovery message. The communications manager 1120 is capable of, configured to, or operable to support a means for transmitting, to the second network entity, a list of discoveree UEs of the one or more discoveree UEs that satisfy criteria for the discovery for the sidelink communication according to the one or more parameters.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of techniques for sidelink based discovery as described herein, or the at least one processor 1135 and the at least one memory 1125 may be otherwise configured to, individually or collectively, perform or support such operations.

FIG. 12 shows a flowchart illustrating a method 1200 that supports techniques for sidelink based discovery in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting, to a network entity, a discovery message requesting information for discovery of discoveree UEs for sidelink communication, the discovery message including one or more parameters that indicate a discovery model type, a geographic range relative to the discoverer UE, a cast type, or a combination thereof. The operations of block 1205 may be performed in accordance with examples as disclosed herein. In some examples, aspects of the operations of 1205 may be performed by a discovery messaging component 625 as described with reference to FIG. 6.

At 1210, the method may include receiving, from the network entity, a response to the discovery message indicating a list of one or more of the discoveree UEs that satisfy criteria for the discovery for the sidelink communication according to the one or more parameters. The operations of block 1210 may be performed in accordance with examples as disclosed herein. In some examples, aspects of the operations of 1210 may be performed by a discovery monitoring component 630 as described with reference to FIG. 6.

At 1215, the method may include performing, with at least one UE from the list of one or more of the discoveree UEs, a wireless connection setup procedure in accordance with the one or more parameters. The operations of block 1215 may be performed in accordance with examples as disclosed herein. In some examples, aspects of the operations of 1215 may be performed by a wireless connection component 635 as described with reference to FIG. 6.

FIG. 13 shows a flowchart illustrating a method 1300 that supports techniques for sidelink based discovery in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a discovery message requesting information associated with establishing sidelink communication with a discoverer UE, the discovery message including one or more parameters that indicate a discovery model type, a geographic range relative to the discoverer UE, a cast type, or a combination thereof. The operations of block 1305 may be performed in accordance with examples as disclosed herein. In some examples, aspects of the operations of 1305 may be performed by a discovery monitoring component 630 as described with reference to FIG. 6.

At 1310, the method may include transmitting, to the network entity, a response to the discovery message indicating whether the discoveree UE is available for discovery by the discoverer UE in accordance with the one or more parameters indicated in the discovery message. The operations of block 1310 may be performed in accordance with examples as disclosed herein. In some examples, aspects of the operations of 1310 may be performed by a discovery messaging component 625 as described with reference to FIG. 6.

FIG. 14 shows a flowchart illustrating a method 1400 that supports techniques for sidelink based discovery in accordance with aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include receiving, from a discoverer UE, a discovery message requesting information for discovery of discoveree UEs for sidelink communication, the discovery message including one or more parameters that indicate a discovery model type, a geographic range relative to the discoverer UE, a cast type, or a combination thereof. The operations of block 1405 may be performed in accordance with examples as disclosed herein. In some examples, aspects of the operations of 1405 may be performed by a discovery monitoring component 1025 as described with reference to FIG. 10.

At 1410, the method may include transmitting, to one or more second network entities, the discovery message received from the discoverer UE. The operations of block 1410 may be performed in accordance with examples as disclosed herein. In some examples, aspects of the operations of 1410 may be performed by a discovery messaging component 1030 as described with reference to FIG. 10.

At 1415, the method may include receiving, from the one or more second network entities, a respective response to the discovery message indicating a respective list of one or more of the discoveree UEs that satisfy criteria for the discovery for the sidelink communication according to the one or more parameters. The operations of block 1415 may be performed in accordance with examples as disclosed herein. In some examples, aspects of the operations of 1415 may be performed by a discovery monitoring component 1025 as described with reference to FIG. 10.

At 1420, the method may include transmitting, to the discoverer UE, a control message that includes a list of the discoveree UEs that satisfy criteria for the discovery for the sidelink communication according to the one or more parameters. The operations of block 1420 may be performed in accordance with examples as disclosed herein. In some examples, aspects of the operations of 1420 may be performed by a discovery messaging component 1030 as described with reference to FIG. 10.

Figure 15:
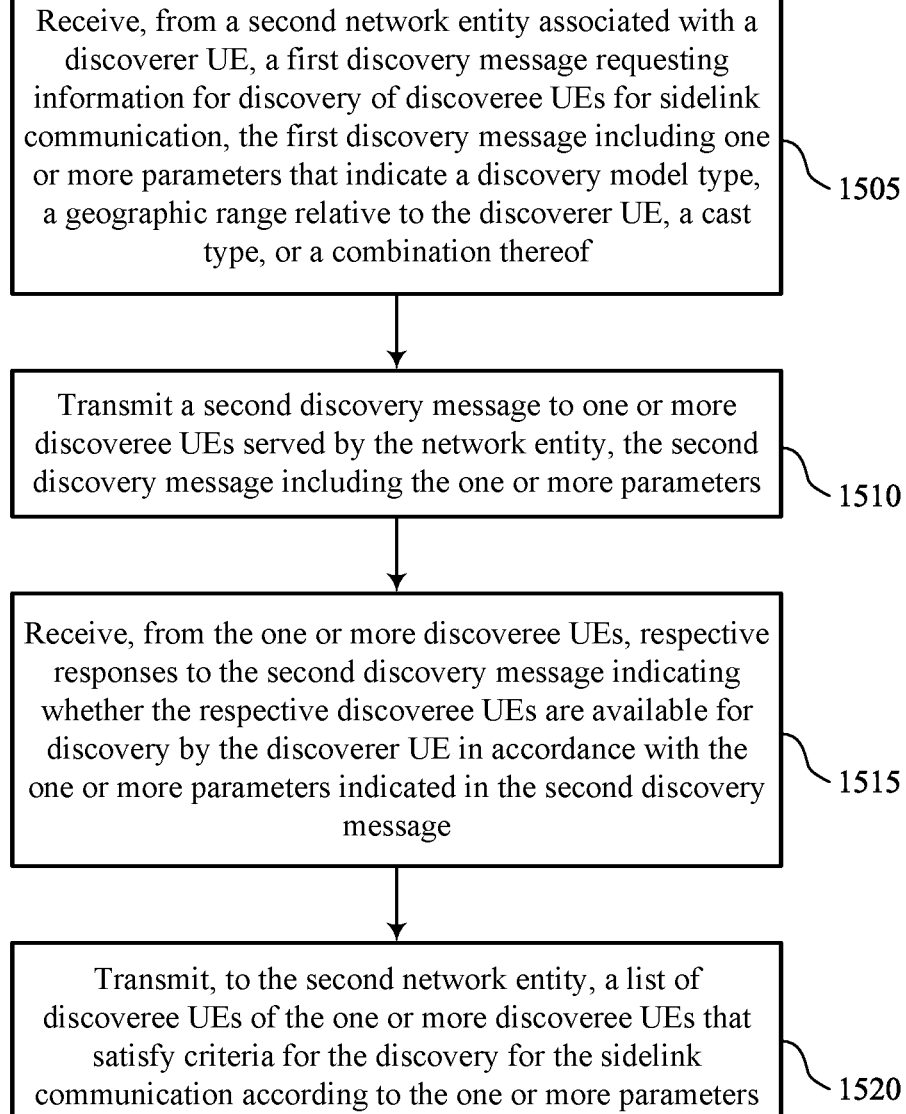

FIG. 15 shows a flowchart illustrating a method 1500 that supports techniques for sidelink based discovery in accordance with aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a second network entity associated with a discoverer UE, a first discovery message requesting information for discovery of discoveree UEs for sidelink communication, the first discovery message including one or more parameters that indicate a discovery model type, a geographic range relative to the discoverer UE, a cast type, or a combination thereof. The operations of block 1505 may be performed in accordance with examples as disclosed herein. In some examples, aspects of the operations of 1505 may be performed by a discovery monitoring component 1025 as described with reference to FIG. 10.

At 1510, the method may include transmitting a second discovery message to one or more discoveree UEs served by the network entity, the second discovery message including the one or more parameters. The operations of block 1510 may be performed in accordance with examples as disclosed herein. In some examples, aspects of the operations of 1510 may be performed by a discovery messaging component 1030 as described with reference to FIG. 10.

At 1515, the method may include receiving, from the one or more discoveree UEs, respective responses to the second discovery message indicating whether the respective discoveree UEs are available for discovery by the discoverer UE in accordance with the one or more parameters indicated in the second discovery message. The operations of block 1515 may be performed in accordance with examples as disclosed herein. In some examples, aspects of the operations of 1515 may be performed by a discovery monitoring component 1025 as described with reference to FIG. 10.

At 1520, the method may include transmitting, to the second network entity, a list of discoveree UEs of the one or more discoveree UEs that satisfy criteria for the discovery for the sidelink communication according to the one or more parameters. The operations of block 1520 may be performed in accordance with examples as disclosed herein. In some examples, aspects of the operations of 1520 may be performed by a discovery messaging component 1030 as described with reference to FIG. 10.

The following provides an overview of aspects of the present disclosure:

Aspect 1: A method for wireless communications, at a discoverer UE, comprising: transmitting, to a network entity, a discovery message requesting information for discovery of discoveree UEs for sidelink communication, the discovery message comprising one or more parameters that indicate a discovery model type, a geographic range relative to the discoverer UE, a cast type, or a combination thereof; receiving, from the network entity, a response to the discovery message indicating a list of one or more of the discoveree UEs that satisfy criteria for the discovery for the sidelink communication according to the one or more parameters; and performing, with at least one UE from the list of one or more of the discoveree UEs, a wireless connection setup procedure in accordance with the one or more parameters.

Aspect 2: The method of aspect 1, wherein the cast type comprises a plurality of cast types and the geographic range comprises a plurality of geographic ranges, and each of the plurality of cast types is associated with a respective geographic range of the plurality of geographic ranges.

Aspect 3: The method of any of aspects 1 through 2, wherein the discovery message comprises a first discovery code that indicates the one or more parameters, and the discoverer UE is associated with a set of discovery codes that each correspond to a respective set of the one or more parameters.

Aspect 4: The method of any of aspects 1 through 3, wherein the one or more parameters further indicate a reason for discovery by the discoverer UE.

Aspect 5: The method of any of aspects 1 through 4, wherein the discoverer UE is associated with the network entity and the one or more of the discoveree UEs are associated with one or more second network entities.

Aspect 6: The method of any of aspects 1 through 5, wherein the discovery message is transmitted via a RRC configuration message, a RRC reconfiguration message, a MAC-CE message, or an SR message.

Aspect 7: The method of any of aspects 1 through 6, wherein the response to the discovery message further indicates a respective V2X identifier for each discoveree UE of the list of one or more of the discoveree UEs.

Aspect 8: The method of any of aspects 1 through 7, wherein the discoverer UE receives the response to the discovery message via a RRC message.

Aspect 9: A method for wireless communications, at a discoveree UE, comprising: receiving, from a network entity, a discovery message requesting information associated with establishing sidelink communication with a discoverer UE, the discovery message comprising one or more parameters that indicate a discovery model type, a geographic range relative to the discoverer UE, a cast type, or a combination thereof; and transmitting, to the network entity, a response to the discovery message indicating whether the discoveree UE is available for discovery by the discoverer UE in accordance with the one or more parameters indicated in the discovery message.

Aspect 10: The method of aspect 9, further comprising: receiving DCI scrambled with a RNTI associated with sidelink discovery; and decoding the DCI using the RNTI, wherein a result of the decoding indicates that an associated downlink channel comprises the discovery message.

Aspect 11: The method of aspect 10, further comprising: receiving, prior to receiving the DCI, an indication of the RNTI associated with sidelink discovery, wherein decoding the DCI is based at least in part on receiving the indication of the RNTI.

Aspect 12: The method of any of aspects 10 through 11, wherein receiving the discovery message comprises: receiving, via the associated downlink channel, a discovery code that indicates the one or more parameters of the discovery message.

Aspect 13: The method of any of aspects 10 through 12, wherein the discoveree UE periodically monitors for the DCI scrambled with the RNTI associated with sidelink discovery.

Aspect 14: The method of any of aspects 9 through 13, further comprising: receiving DCI comprising a bit value that indicates a presence of the discovery message and a discovery code that indicates the one or more parameters of the discovery message.

Aspect 15: The method of any of aspects 9 through 14, further comprising: receiving DCI comprising a bit value that indicates that an associated downlink channel comprises the discovery message; and receiving the discovery message comprises receiving, via the associated downlink channel, a discovery code that indicates the one or more parameters of the discovery message.

Aspect 16: The method of any of aspects 9 through 15, wherein receiving the discovery message comprises: receiving a RRC reconfiguration message that comprises: a discovery message indicator that indicates a presence of the discovery message; a discovery code that indicates the one or more parameters of the discovery message; and a reason for discovery by the discoverer UE.

Aspect 17: The method of any of aspects 9 through 16, wherein transmitting the response to the discovery message comprises: transmitting, as part of the response to the discovery message, an availability to be discovered by the discoverer UE according to the one or more parameters indicated in the discovery message and a first V2X identifier associated with the discoveree UE.

Aspect 18: The method of aspect 17, further comprising: transmitting, to the network entity, a mapping between a pseudo V2X identifier and the first V2X identifier, wherein the mapping indicates for the network entity to relay the pseudo V2X identifier to the discoverer UE as part of the response to the discovery message.

Aspect 19: The method of any of aspects 9 through 18, wherein the discoverer UE is associated with a second network entity different than the network entity associated with the discoveree UE.

Aspect 20: A method for wireless communications, at a network entity, comprising: receiving, from a discoverer UE, a discovery message requesting information for discovery of discoveree UEs for sidelink communication, the discovery message comprising one or more parameters that indicate a discovery model type, a geographic range relative to the discoverer UE, a cast type, or a combination thereof; transmitting, to one or more second network entities, the discovery message received from the discoverer UE; receiving, from the one or more second network entities, a respective response to the discovery message indicating a respective list of one or more of the discoveree UEs that satisfy criteria for the discovery for the sidelink communication according to the one or more parameters; and transmitting, to the discoverer UE, a control message that comprises a list of the discoveree UEs that satisfy criteria for the discovery for the sidelink communication according to the one or more parameters.

Aspect 21: The method of aspect 20, wherein the one or more second network entities satisfy the geographic range relative to the discoverer UE.

Aspect 22: The method of any of aspects 20 through 21, wherein the one or more second network entities satisfy a quantity second network entities closest to the discoverer UE.

Aspect 23: The method of any of aspects 20 through 22, wherein the control message is a RRC message for a vehicle-to-network-to-everything discovery outcome and the list indicates a respective V2X identifier for each of the discoveree UEs.

Aspect 24: A method for wireless communications, at a network entity, comprising: receiving, from a second network entity associated with a discoverer UE, a first discovery message requesting information for discovery of discoveree UEs for sidelink communication, the first discovery message comprising one or more parameters that indicate a discovery model type, a geographic range relative to the discoverer UE, a cast type, or a combination thereof; transmitting a second discovery message to one or more discoveree UEs served by the network entity, the second discovery message comprising the one or more parameters; receiving, from the one or more discoveree UEs, respective responses to the second discovery message indicating whether the respective discoveree UEs are available for discovery by the discoverer UE in accordance with the one or more parameters indicated in the second discovery message; and transmitting, to the second network entity, a list of discoveree UEs of the one or more discoveree UEs that satisfy criteria for the discovery for the sidelink communication according to the one or more parameters.

Aspect 25: The method of aspect 24, wherein each respective response to the second discovery message comprises a respective V2X identifier associated with a respective discoveree UE, and the list of discoveree UEs that satisfy the criteria for the discovery includes each respective V2X identifier.

Aspect 26: The method of aspect 25, further comprising: receiving, from a first discoveree UE of the one or more discoveree UEs, a mapping between a pseudo V2X identifier and a V2X identifier, wherein the mapping indicates for the network entity to include the pseudo V2X identifier in the list of discoveree UEs that satisfy the criteria for the discovery.

Aspect 27: The method of any of aspects 24 through 26, wherein the network entity transmits the list of discoveree UEs that satisfy the criteria for the discovery via an X2 interface.

Aspect 28: A discoverer UE for wireless communications, comprising one or more memories storing processor-executable code, and one or more processors coupled with the one or more memories and individually or collectively operable to execute the code to cause the discoverer UE to perform a method of any of aspects 1 through 8.

Aspect 29: A discoverer UE for wireless communications, comprising at least one means for performing a method of any of aspects 1 through 8.

Aspect 30: A non-transitory computer-readable medium storing code for wireless communications, the code comprising instructions executable by one or more processors individually or collectively to perform a method of any of aspects 1 through 8.

Aspect 31: A discoveree UE for wireless communications, comprising one or more memories storing processor-executable code, and one or more processors coupled with the one or more memories and individually or collectively operable to execute the code to cause the discoveree UE to perform a method of any of aspects 9 through 19.

Aspect 32: A discoveree UE for wireless communications, comprising at least one means for performing a method of any of aspects 9 through 19.

Aspect 33: A non-transitory computer-readable medium storing code for wireless communications, the code comprising instructions executable by one or more processors individually or collectively to perform a method of any of aspects 9 through 19.

Aspect 34: A network entity for wireless communications, comprising one or more memories storing processor-executable code, and one or more processors coupled with the one or more memories and individually or collectively operable to execute the code to cause the network entity to perform a method of any of aspects 20 through 23.

Aspect 35: A network entity for wireless communications, comprising at least one means for performing a method of any of aspects 20 through 23.

Aspect 36: A non-transitory computer-readable medium storing code for wireless communications, the code comprising instructions executable by one or more processors individually or collectively to perform a method of any of aspects 20 through 23.

Aspect 37: A network entity for wireless communications, comprising one or more memories storing processor-executable code, and one or more processors coupled with the one or more memories and individually or collectively operable to execute the code to cause the network entity to perform a method of any of aspects 24 through 27.

Aspect 38: A network entity for wireless communications, comprising at least one means for performing a method of any of aspects 24 through 27.

Aspect 39: A non-transitory computer-readable medium storing code for wireless communications, the code comprising instructions executable by one or more processors individually or collectively to perform a method of any of aspects 24 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A discoverer user equipment (UE), comprising:
one or more memories storing processor-executable code; and
one or more processors coupled with the one or more memories and individually or collectively operable to execute the code to cause the discoverer UE to:
transmit, to a network entity, a discovery message requesting information for discovery of discoveree UEs for sidelink communication, the discovery message comprising one or more parameters that indicate a cast type corresponding to a geographic range relative to the discoverer UE;
receive, from the network entity, a response to the discovery message indicating a list of one or more of the discoveree UEs that satisfy the geographic range relative to the discoverer UE in accordance with the indicated cast type; and
perform, with at least one UE from the list of one or more of the discoveree UEs, a wireless connection setup procedure in accordance with the one or more parameters.

2. The discoverer UE of claim 1, wherein the cast type comprises a plurality of cast types, and wherein the geographic range comprises a plurality of geographic ranges, and wherein each of the plurality of cast types is associated with a respective geographic range of the plurality of geographic ranges.

3. The discoverer UE of claim 1, wherein the discovery message comprises a first discovery code that indicates the one or more parameters, and wherein the discoverer UE is associated with a set of discovery codes that each correspond to a respective set of the one or more parameters.

4. The discoverer UE of claim 1, wherein the one or more parameters further indicate a reason for discovery by the discoverer UE.

5. The discoverer UE of claim 1, wherein the discoverer UE is associated with the network entity and the one or more of the discoveree UEs are associated with one or more second network entities.

6. The discoverer UE of claim 1, wherein the discovery message is transmitted via a radio resource control configuration message, a radio resource control reconfiguration message, a medium access control-control element message, or a scheduling request message.

7. The discoverer UE of claim 1, wherein the response to the discovery message further indicates a respective vehicle-to-everything identifier for each discoveree UE of the list of one or more of the discoveree UEs.

8. The discoverer UE of claim 1, wherein the discoverer UE receives the response to the discovery message via a radio resource control message.

9. A discoveree user equipment (UE), comprising:
one or more memories storing processor-executable code; and
one or more processors coupled with the one or more memories and individually or collectively operable to execute the code to cause the discoveree UE to:
receive, from a network entity, a discovery message requesting information associated with establishing sidelink communication with a discoverer UE, the discovery message comprising one or more parameters that indicate a cast type corresponding to a geographic range relative to the discoverer UE; and
transmit, to the network entity, a response to the discovery message indicating whether the discoveree UE is available for discovery by the discoverer UE in accordance with the discoveree UE satisfying the geographic range relative to the discoverer UE in accordance with the indicated cast type.

10. The discoveree UE of claim 9, wherein the one or more processors are individually or collectively further operable to execute the code to cause the discoveree UE to:
receive downlink control information scrambled with a radio network temporary identifier associated with sidelink discovery; and
decode the downlink control information using the radio network temporary identifier, wherein a result of the decoding indicates that an associated downlink channel comprises the discovery message.

11. The discoveree UE of claim 10, wherein the one or more processors are individually or collectively further operable to execute the code to cause the discoveree UE to:
receive, prior to receiving the downlink control information, an indication of the radio network temporary identifier associated with sidelink discovery, wherein decoding the downlink control information is based at least in part on receiving the indication of the radio network temporary identifier.

12. The discoveree UE of claim 10, wherein, to receive the discovery message, the one or more processors are individually or collectively operable to execute the code to cause the discoveree UE to:
receive, via the associated downlink channel, a discovery code that indicates the one or more parameters of the discovery message.

13. The discoveree UE of claim 10, wherein the discoveree UE periodically monitors for the downlink control information scrambled with the radio network temporary identifier associated with sidelink discovery.

14. The discoveree UE of claim 9, wherein the one or more processors are individually or collectively further operable to execute the code to cause the discoveree UE to:
receive downlink control information comprising a bit value that indicates a presence of the discovery message and a discovery code that indicates the one or more parameters of the discovery message.

15. The discoveree UE of claim 9, wherein the one or more processors are individually or collectively further operable to execute the code to cause the discoveree UE to:
receive downlink control information comprising a bit value that indicates that an associated downlink channel comprises the discovery message; and
to receive the discovery message, the one or more processors are individually or collectively further operable to execute the code to cause the discoveree UE to:
receive, via the associated downlink channel, a discovery code that indicates the one or more parameters of the discovery message.

16. The discoveree UE of claim 9, wherein, to receive the discovery message, the one or more processors are individually or collectively operable to execute the code to cause the discoveree UE to:
receive a radio resource control reconfiguration message that comprises:
a discovery message indicator that indicate a presence of the discovery message;
a discovery code that indicate the one or more parameters of the discovery message; and
a reason for discovery by the discoverer UE.

17. The discoveree UE of claim 9, wherein, to transmit the response to the discovery message, the one or more processors are individually or collectively operable to execute the code to cause the discoveree UE to:
transmit, as part of the response to the discovery message, an availability to be discovered by the discoverer UE according to the one or more parameters indicated in the discovery message and a first vehicle-to-everything identifier associated with the discoveree UE.

18. The discoveree UE of claim 17, wherein the one or more processors are individually or collectively further operable to execute the code to cause the discoveree UE to:
transmit, to the network entity, a mapping between a pseudo vehicle-to-everything identifier and the first vehicle-to-everything identifier, wherein the mapping indicates for the network entity to relay the pseudo vehicle-to-everything identifier to the discoverer UE as part of the response to the discovery message.

19. The discoveree UE of claim 9, wherein the discoverer UE is associated with a second network entity different than the network entity associated with the discoveree UE.

20. A method for wireless communications, at a discoverer user equipment (UE), comprising:
transmitting, to a network entity, a discovery message requesting information for discovery of discoveree UEs for sidelink communication, the discovery message comprising one or more parameters that indicate a cast type corresponding to a geographic range relative to the discoverer UE;
receiving, from the network entity, a response to the discovery message indicating a list of one or more of the discoveree UEs that satisfy the geographic range relative to the discoverer UE in accordance with the indicated cast type; and performing, with at least one UE from the list of one or more of the discoveree UEs, a wireless connection setup procedure in accordance with the one or more parameters.

21. The method of claim 20, wherein the cast type comprises a plurality of cast types, and wherein the geographic range comprises a plurality of geographic ranges, and wherein each of the plurality of cast types is associated with a respective geographic range of the plurality of geographic ranges.

22. The method of claim 20, wherein the discovery message comprises a first discovery code that indicates the one or more parameters, and wherein the discoverer UE is associated with a set of discovery codes that each correspond to a respective set of the one or more parameters.

23. The method of claim 20, wherein the one or more parameters further indicate a reason for discovery by the discoverer UE.

24. The method of claim 20, wherein the discoverer UE is associated with the network entity and the one or more of the discoveree UEs are associated with one or more second network entities.

25. The method of claim 20, wherein the discovery message is transmitted via a radio resource control configuration message, a radio resource control reconfiguration message, a medium access control-control element message, or a scheduling request message.

26. The method of claim 20, wherein the response to the discovery message further indicates a respective vehicle-to-everything identifier for each discoveree UE of the list of one or more of the discoveree UEs.

27. The method of claim 20, wherein the discoverer UE receives the response to the discovery message via a radio resource control message.

28. A method for wireless communications, at a discoveree user equipment (UE), comprising:
receiving, from a network entity, a discovery message requesting information associated with establishing sidelink communication with a discoverer UE, the discovery message comprising one or more parameters that indicate a cast type corresponding to a geographic range relative to the discoverer UE; and
transmitting, to the network entity, a response to the discovery message indicating whether the discoveree UE is available for discovery by the discoverer UE in accordance with the discoveree UE satisfying the geographic range relative to the discoverer UE in accordance with the indicated cast type.

29. The method of claim 28, further comprising:
receiving downlink control information scrambled with a radio network temporary identifier associated with sidelink discovery; and
decoding the downlink control information using the radio network temporary identifier, wherein a result of the decoding indicates that an associated downlink channel comprises the discovery message.

30. The method of claim 29, further comprising:
receiving, prior to receiving the downlink control information, an indication of the radio network temporary identifier associated with sidelink discovery, wherein decoding the downlink control information is based at least in part on receiving the indication of the radio network temporary identifier.

* * * * *